US010936907B2

(12) United States Patent
Suresh et al.

(10) Patent No.: US 10,936,907 B2
(45) Date of Patent: Mar. 2, 2021

(54) TRAINING A DEEP LEARNING SYSTEM FOR MARITIME APPLICATIONS

(71) Applicant: Buffalo Automation Group Inc., Amherst, NY (US)

(72) Inventors: Thiru Vikram Suresh, Amherst, NY (US); Mohit Arvind Khakharia, Amherst, NY (US)

(73) Assignee: Buffalo Automation Group Inc., Amherst, NY (US)

( * ) Notice: Subject to any disclaimer, the term of this patent is extended or adjusted under 35 U.S.C. 154(b) by 0 days.

(21) Appl. No.: 16/537,706

(22) Filed: Aug. 12, 2019

(65) Prior Publication Data
US 2020/0050893 A1 Feb. 13, 2020

Related U.S. Application Data

(60) Provisional application No. 62/717,746, filed on Aug. 10, 2018, provisional application No. 62/724,349, filed on Aug. 29, 2018.

(51) Int. Cl.
*G06K 9/00* (2006.01)
*G06K 9/62* (2006.01)
*G06T 7/194* (2017.01)
*G06T 7/50* (2017.01)
*G06T 11/40* (2006.01)
(Continued)

(52) U.S. Cl.
CPC ......... *G06K 9/6256* (2013.01); *G05D 1/0206* (2013.01); *G06N 3/04* (2013.01); *G06N 3/08* (2013.01); *G06T 7/194* (2017.01); *G06T 7/50* (2017.01); *G06T 11/40* (2013.01); *G06T 2207/10012* (2013.01); *G06T 2207/20081* (2013.01); *G06T 2207/20228* (2013.01); *G06T 2207/30261* (2013.01)

(58) Field of Classification Search
CPC ........................................... G06T 2207/20228
See application file for complete search history.

(56) References Cited

U.S. PATENT DOCUMENTS 7,035,166 B2    4/2006 Zimmerman et al.
7,127,348 B2    10/2006 Smitherman et al.
(Continued)

FOREIGN PATENT DOCUMENTS

CN    107609601 A    1/2018
CN    108256634 A    7/2018
(Continued)

OTHER PUBLICATIONS

Jarvis, Ray, "Tele-autonomous watercraft navigation", Experimental Robotics, Jan. 25, 2002, VII, pp. 543-550, Springer, Berlin, Heidelberg.

(Continued)

Primary Examiner — Oneal R Mistry
(74) Attorney, Agent, or Firm — Hodgson Russ LLP

(57) ABSTRACT

An object detection network can be trained with training images to identify and classify objects in images from a sensor system disposed on a maritime vessel. The objects in the images can be identified, classified, and heat maps can be generated. Instructions can be sent regarding operation of the maritime vessel. For some training images, water conditions, sky conditions, and/or light conditions in the image can be changed to generate a second image.

18 Claims, 25 Drawing Sheets

(51) Int. Cl.
*G05D 1/02* (2020.01)
*G06N 3/04* (2006.01)
*G06N 3/08* (2006.01)

(56) References Cited

U.S. PATENT DOCUMENTS

| | | |
|---|---|---|
| 7,202,776 B2 | 4/2007 | Breed |
| 7,386,226 B2 | 6/2008 | Miyoshi et al. |
| 8,049,658 B1 | 11/2011 | Lagonik et al. |
| 8,050,863 B2 | 11/2011 | Trepagnier et al. |
| 8,150,621 B1 | 4/2012 | Phillips et al. |
| 8,350,894 B2 | 1/2013 | Turner et al. |
| 8,527,445 B2 | 9/2013 | Karins et al. |
| 8,612,129 B2 | 12/2013 | Gagliardi et al. |
| 8,639,426 B2 | 1/2014 | Dedes et al. |
| 8,849,483 B2 | 9/2014 | Kuwata et al. |
| 8,989,948 B2 | 3/2015 | Huntsberger et al. |
| 9,031,809 B1 | 5/2015 | Kumar et al. |
| 9,066,085 B2 | 6/2015 | Cluff et al. |
| 9,164,511 B1 | 10/2015 | Ferguson et al. |
| 9,396,415 B2 | 7/2016 | Chertok et al. |
| 9,454,816 B2 | 9/2016 | Mian et al. |
| 9,542,626 B2 | 1/2017 | Martinson et al. |
| 9,664,789 B2 | 5/2017 | Rosenblum et al. |
| 9,734,583 B2 | 8/2017 | Walker et al. |
| 9,739,881 B1 | 8/2017 | Pavek et al. |
| 9,877,009 B2 | 1/2018 | Tran et al. |
| 9,963,215 B2 | 5/2018 | Sidki et al. |
| 9,989,964 B2 | 6/2018 | Berntorp et al. |
| 10,007,269 B1 | 6/2018 | Gray |
| 10,019,002 B2 | 7/2018 | Harnett et al. |
| 10,019,907 B2 | 7/2018 | Kanade et al. |
| 10,062,010 B2 | 8/2018 | Kutliroff |
| 2001/0048763 A1 | 12/2001 | Takatsuka et al. |
| 2006/0170769 A1 | 8/2006 | Zhou |
| 2006/0274381 A1 | 12/2006 | Simard et al. |
| 2009/0290788 A1 | 11/2009 | Bogan et al. |
| 2009/0292468 A1 | 11/2009 | Wu et al. |
| 2010/0066587 A1 | 3/2010 | Yamauchi et al. |
| 2010/0232677 A1 | 9/2010 | Bartsch et al. |
| 2013/0208125 A1 | 8/2013 | Richardson et al. |
| 2013/0282210 A1 | 10/2013 | Kolar et al. |
| 2014/0147039 A1* | 5/2014 | Wang ............... G06K 9/4671 382/165 |
| 2014/0293062 A1 | 10/2014 | Hoye et al. |
| 2015/0234045 A1* | 8/2015 | Rosenblum ............ G01S 13/86 342/71 |
| 2016/0260204 A1 | 9/2016 | Yu et al. |
| 2016/0358043 A1* | 12/2016 | Mu ..................... G06F 16/51 |
| 2017/0291670 A1 | 10/2017 | Johnson |
| 2018/0052457 A1 | 2/2018 | Kim et al. |
| 2018/0059677 A1 | 3/2018 | Zhao et al. |
| 2018/0059679 A1 | 3/2018 | Taimouri et al. |
| 2018/0074493 A1 | 3/2018 | Prokhorov et al. |
| 2018/0164812 A1 | 6/2018 | Oh et al. |
| 2018/0205444 A1* | 7/2018 | Delay ..................... G01S 5/00 |
| 2018/0216958 A1 | 8/2018 | Park |
| 2018/0247160 A1 | 8/2018 | Rohani et al. |
| 2019/0130292 A1* | 5/2019 | N ....................... G06N 3/0454 |
| 2019/0244059 A1* | 8/2019 | Kolouri ............... G06K 9/6254 |
| 2019/0258885 A1* | 8/2019 | Piette ................ G06K 9/00771 |
| 2019/0311227 A1* | 10/2019 | Kriegman ............... G06K 9/46 |
| 2019/0354770 A1* | 11/2019 | Darvish ............... G06K 9/6289 |
| 2020/0130830 A1* | 4/2020 | Dong .................... G05D 1/0016 |

FOREIGN PATENT DOCUMENTS

| | | |
|---|---|---|
| JP | 2001272248 A | 10/2001 |
| KR | 20180065411 A | 6/2018 |
| WO | 2013181631 A2 | 12/2013 |
| WO | 2017136014 A2 | 8/2017 |
| WO | 2017167902 A1 | 10/2017 |
| WO | 2018052875 A1 | 3/2018 |
| WO | 2018086133 A1 | 5/2018 |

OTHER PUBLICATIONS

Sun, Yu, Oct. 6, 2016, "Sensors on AV", retrieved from http://oview.xintech.org/2016/10/06/sensors-on-av/.

Baranski et al., "Enhancing positioning accuracy in urban terrain by fusing data from a GPS receiver, inertial sensors, stereo-camera and digital maps for pedestrian navigation", Sensors, May 25, 2012, issue 12(6), pp. 5764-5801.

Choi et al., "Design of Multi-Sensor-Based Open Architecture Integrated Navigation System for Localization of UGV", Journal of Positioning, Navigation, and Timing, Jan. 1, 2012, issue 1(1), pp. 35-43.

Simrad, "Marine electronics for powerboats and sportshing", Jan. 1, 2017, retrieved from http://ww2.simrad-yachting.com/Root/Catalogs/SimradYachting/2017/simrad2017_Catalog_Final.pdf.

Sport Fishing, "Top electronics technology for your midsize to large center console", Apr. 30, 2018, retrieved from https://www.sportfishingmag.com/top-electronics-technology-for-your-midisze-to-large-center-console/.

Prasad et al., "Video processing from electro-optical sensors for object detection and tracking in a maritime environment: a survey", IEEE Transactions on Intelligent Transportation Systems, Aug. 1, 2017, vol. 18, Issue No. 8, pp. 1993-2016.

Mou et al., "Wide-baseline stereo-based obstacle mapping for unmanned surface vehicles.", Sensors, May 3, 2018, vol. 18, Issue No. 4, pp. 1085.

Muller et al., "Survey on ranging sensors and cooperative techniques for relative positioning of vehicles.", Sensors, Jan. 30, 2017, vol. 17, Issue No. 2, pp. 271.

Nomura et al., "A feasibility study of accurate 3D measurement of ships using dense stereo vision system.", Techno-Ocean, Apr. 3, 2017, IEEE, pp. 562-565.

Bergamasco et al., "Multi-view horizon-driven sea plane estimation for stereo wave imaging on moving vessels.", Computers & geosciences, Oct. 1, 2016, 95, pp. 105-117.

Hussein et al., "Autonomous off-road navigation using stereo-vision and laser-rangefinder fusion for outdoor obstacles detection.", IEEE Intelligent Vehicles Symposium (IV), Aug. 8, 2016, IEEE, pp. 104-109.

Huntsberger et al., "Stereo vision—based navigation for autonomous surface vessels.", Journal of Field Robotics Jan. 28, 2011, 28, No. 1 : pp. 3-18.

Muhovic et al., "Depth Fingerprinting for Obstacle Tracking using 3D Point Cloud.", 23rd Computer Vision Winter Norkshop, Feb. 7, 2018, pp. 71-78.

Liu et al., "Unmanned surface vehicles: An overview of developments and challenges.", Annual Reviews in Control 41 (2016), Jan. 1, 2016, pp. 71-93.

Singh et al., "Optimal path planning of unmanned surface vehicles." Indian Journal of geo marine sciences, Jul. 31, 2018, vol. 47, Issue 07, pp. 1325-1334.

Larson et al., "Autonomous navigation and obstacle avoidance for unmanned surface vehicles.", Unmanned Systems Technology VIII, May 9, 2006, International Society for Optics and Photonics, vol. 6230, p. 623007.

Jiao et al., "A densely connected end-to-end neural network for multiscale and multiscene SAR ship detection", IEEE Access, May 2, 2018, vol. 6: pp. 20881-20892.

Kim et al., "Probabilistic ship detection and classification using deep learning.", Applied Sciences, Jun. 5, 2018, vol. 8, issue No. 6, p. 936.

Steccanella et al., "Deep Learning Waterline Detection for Low-Cost Autonomous Boats.", International Conference on Intelligent Autonomous Systems, Dec. 31, 2017. pp. 613-625. Springer, Cham.

Liu et al., "Learning a rotation invariant detector with rotatable bounding box.", arXiv preprint arXiv:1711.09405, Nov. 26, 2017.

Ngeno et al., "Ship Identification for Port Security using Faster Region Convolution Neural Network.", IEICE General conference, Dec. 31, 2017, BS-1, vol. 12.

Li et al., "DeepUNet: a deep fully convolutional network for pixel-level sea-land segmentation.", IEEE Journal of Selected Topics in Applied Earth Observations and Remote Sensing 11, May 31, 2018, No. 11, pp. 3954-3962.

(56) References Cited

OTHER PUBLICATIONS

Redmon et al., "You only look once: Unified, real-time object detection.", Proceedings of the IEEE conference on computer vision and pattern recognition, Dec. 31, 2016, pp. 779-788.
Ren et al., "Faster r-cnn: Towards real-time object detection with region proposal networks.", Advances in neural information processing systems, Dec. 31, 2015, pp. 91-99.
Girshick, "Fast r-cnn.", Proceedings of the IEEE international conference on computer vision, Dec. 31, 2015, pp. 1440-1448.
Zbontar et al., Stereo Matching by Training a Convolutional Neural Network to Compare Image Patches, J. Mach. Learning Research 17 (2016) 1-32.
Huntsberger et al., "Stereo vision-based navigation for autonomous surface vessels," Journal of Field Robotics, 28.1, 3-18, Jan. 2011.
Krause et al., "3D object representations for fine-grained categorization," Dec. 2, 2013.
WIPO, ISR for PCT/US2019/046208, Nov. 5, 2019.
Hamzah & Ibrahim, Literature Survey on Stereo Vision Disparity Map Algorithms, J. of Sensors, vol. 2016, 8742920, 2016.
Wikipedia, Thermography, retrieved from https://en.wikipedia.org/wiki/Thermography on Oct. 21, 2020 (last modified Oct. 20, 2020).

\* cited by examiner iceberg (score = 0.99535)
ocean (score = 0.00358)
boatship (score = 0.00108)

ocean (score = 0.97706)
boatship (score = 0.02040)
iceberg (score = 0.00255)

boatship (score = 0.99137)
iceberg (score = 0.00701)
ocean (score = 0.00162)

boatship (score = 0.79449)
iceberg (score = 0.20249)
ocean (score = 0.00302)

Figure 1: Neural network $$\begin{bmatrix} 1 \\ 1 & 1 \\ & 1 \\ 1 & 1 \\ & 1 & -4 & 1 \\ & & 1 & 1 \\ & & & 1 \\ & & & 1 & 1 \\ & & & & 1 \end{bmatrix} \times \begin{bmatrix} R_1 & G_1 & B_1 \\ R_2 & G_2 & B_2 \\ R_3 & G_3 & B_3 \\ R_4 & G_4 & B_4 \\ R_5 & G_5 & B_5 \\ R_6 & G_6 & B_6 \\ R_7 & G_7 & B_7 \\ R_8 & G_8 & B_8 \\ R_9 & G_9 & B_9 \end{bmatrix} = \begin{bmatrix} uR_1 & uG_1 & uB_1 \\ uR_2 & uG_2 & uB_2 \\ uR_3 & uG_3 & uB_3 \\ uR_4 & uG_4 & uB_4 \\ divR_5 & divG_5 & divB_5 \\ uR_6 & uG_6 & uB_6 \\ uR_7 & uG_7 & uB_7 \\ uR_8 & uG_8 & uB_8 \\ uR_9 & uG_9 & uB_9 \end{bmatrix}$$

FIG. 23

TRAINING A DEEP LEARNING SYSTEM FOR MARITIME APPLICATIONS

CROSS REFERENCE TO RELATED APPLICATIONS

This application claims priority to U.S. Provisional Patent Application No. 62/717,746, filed on Aug. 10, 2018, and U.S. Provisional Patent Application No. 62/724,349, filed on Aug. 29, 2018, the disclosures of which are hereby incorporated by reference.

FIELD OF THE DISCLOSURE

The disclosure generally relates to autonomous vehicles. More particularly the disclosure generally relates to systems and methods for controlling maritime vessels.

BACKGROUND OF THE DISCLOSURE

Each year, recreational boating accidents cause hundreds of fatalities and thousands of injuries nationwide, according to U.S. Coast Guard data. These are vessels are often big enough for a family to spend anywhere from a few days to a few weeks on the water, but are too small to hire a crew, or even a junior captain. These circumstances require a captain to keep constant vigil over the boat, raising the likelihood of human error due to fatigue, distraction, or attention lapses.

Human error frequently leads to maritime accidents at sea. For example, when the Costa Concordia hit a rock near Tuscany, Italy, and dipped into the Mediterranean in 2012, people around the world wondered how the captain of a cruise ship carrying 4,229 people could have made such a simple, yet fatal miscalculation. Altogether, 32 passengers died. Early on 17 Jun. 2017, the U.S. Navy destroyer USS Fitzgerald collided with MV ACX Crystal, a Philippine-flagged container ship, about 10 nautical miles southeast of the city of Shimoda on the Japanese mainland, Honshu. The accident killed seven Fitzgerald sailors.

Certain features have been included in automobiles, such as lane detection and lane centering. However, such applications lack the ability to sense features a maritime vessel may encounter. Further, unlike an automobile, a maritime vessel requires the ability to navigate with or without any external landmarks or objects.

Existing artificial intelligence systems also are impeded by surroundings of high reflectivity and dynamic textures—both of which are exhibited in water—and the prevalence of shadows. Existing systems also lack the ability to detect a true horizon, as systems operating on land cannot detect a true horizon.

Existing systems also lack the ability, and need, to detect states of operation of objects for purposes of compliance with the 1972 International Regulations for Preventing Collisions at Sea (COLREGS). For example, under COLREGS, a sailboat with sails unfurled is considered to have different right-of-way privileges than a sailboat with sails withdrawn operating on backup motors.

Similar to airplanes, many vessels have an autopilot option. These systems typically rely on global positioning system (GPS) or similar satellite-based localization systems, a digital compass and a digital nautical chart to navigate. Such systems have no way of detecting any vessels, debris, or other dynamic nautical features that are not marked on their nautical charts. Such systems rely on following waypoints, and do not adjust based on the dynamic environment. In other words, they lack both the hardware and the software to build a real-time map of their surroundings. These systems are also reactive, meaning that they respond only after the boat senses a change in tide, wind, heading, or other conditions. This is similar to cruise control on an automobile. The autopilot systems do not predict the trajectory of other nautical objects in their vicinity and execute preemptive maneuvers to avoid a collision.

Predictive, rather than reactive, self-driving boat technology has been used by militaries in the United States and abroad. The Pentagon has recently unveiled a self-driving 132-foot ship, the Sea Hunter, which is able to travel up to 10,000 nautical miles on its own, searching for underwater mines and submarines. BAE Systems recently tested a self-driving boat technology that can be fitted to smaller Rigid Inflatable Boats. The Royal British Navy is already employing similar technology. However, self-driving boat technology requires real-time, accurate data regarding the boat's position, orientation, and environment to generate safe and efficient navigation paths.

The image dataset in the maritime space is very sparse. Most of the time it is plain water with short bursts of activities that involve other solid objects around. Designers cannot use a traditional approach that assumes the dataset is evenly distributed among all categories of interest. Doing so will cause a biased neural network that will almost always predict that the scene has plain water in sight. An analogy could be if a neural network that is meant to diagnose cancer from the scan report could always give a negative result and still could be 99% accurate because most of the patients who take a precautionary scan do not have cancer, but the neural network would be rendered useless. Similarly, a neural network trained on an unaltered maritime dataset will always detect every scene as water and would still be 99% accurate but it would likely be unusable for its intended purpose. Eliminating water bias would be beneficial for training a neural network or other artificial intelligence in the maritime space.

Furthermore, sets of images are used to train artificial intelligence that operate vehicles, such as boats or cars. However, the image sets are made up of images easily found on the internet. Images of roads or open water only include the most common vehicles. The image sets can include many variations of common cars, trucks, and motorcycles on roads and many variations of common sailboats and cargo ships on the water. However, there are limited images available for more obscure vehicles. If a designer wants to train artificial intelligence to recognize double-decker London buses, motorized trikes, or motorized rickshaws, then a U.S.-based image search is unlikely to provide many examples. Similarly, if a designer wants to train artificial intelligence to recognize dragon boats, dhows, or longships on the ocean, then that U.S.-based image search also is unlikely to provide many examples.

Even if the designer seeks out these more obscure vehicles, only a few images will probably be available. This is unlikely to provide sufficient examples to train the artificial intelligence.

Accordingly, there is a long-felt need for techniques to train a sensor system capable of collecting and processing real-time data for use in predictive navigational systems for self-driving maritime vessels. Furthermore, a new technique to generate data for obscure vehicles is needed.

SUMMARY OF THE DISCLOSURE

A method is provided in a first embodiment. The method comprises training, using a processor, an object detection network with training images to identify and classify objects in images from a sensor system disposed on a maritime vessel. Objects in the images are identified and classified using the processor in an offline mode. Heat maps are generated in the offline mode. Instructions regarding operation of the maritime vessel are sent using the processor based on the objects that are identified. The instructions include a speed or a heading.

The method can further comprise training, using the processor, the object detection network to send the instructions regarding operation of the maritime vessel based on the objects that are identified.

The object detection network can be configured to determine an object depth estimate using the processor. The object depth can be determined by predicting a disparity map and obtaining the object depth.

The objects can include a seashore, a watercraft, an iceberg, a static far object, a moving far object, or plain sea. The watercraft can include a personal non-powered vessel, recreational powered vessel, sailing yacht, cargo ship, cruise ship, coast guard boat, naval vessel, barge, tugboat, fishing vessel, workboat, under-powered vessel, or anchored vessel.

Deduplication of the training images using hash outputs can be performed prior to the training.

The training images can be determined by receiving an initial image of a maritime object at a processor and changing water conditions, sky conditions, and/or light conditions in the image of the maritime object to generate one of the training images using the processor.

A non-transitory computer readable medium storing a program can be configured to instruct a processor to execute the identifying, the classifying, the generating, and the sending of the first embodiment.

An object detection network can be configured to be trained using the method of the first embodiment.

A method is provided in a second embodiment. The method comprises receiving an image of a maritime object at a processor and changing water conditions, sky conditions, and/or light conditions in the image of the maritime object to generate a second image using the processor. An object detection network can be trained using the second image.

In an instance, a plurality of the second image are generated. Each of the plurality of the second images has a different one of the water conditions, the sky conditions, or the light conditions. Deduplication of the second images can be performed using hash outputs prior to the training.

The method can further include receiving a background image with the water conditions, the sky conditions, and/or the light conditions to be used in the second image.

The method can further include generating a mask for the image of the maritime object, synthesizing a background, and blending the background and the image of the maritime object to form the second image.

The changing can further include blending a region of the image of the maritime object with a region of a background image.

The changing can further include determining a gradient field of the image of the maritime object.

The changing can further include determining a gradient field of a background image.

The changing can further include determining a gradient field of the second image fusing the image of the maritime object and the background image.

The changing can further include determining divergence of the second image.

The changing can further include determining a solution for a coefficient matrix.

The processor may be in electronic communication with a data server. The data server can provide the image of the maritime object.

A non-transitory computer readable medium storing a program can be configured to instruct a processor to execute the method of the second embodiment.

An artificial intelligence module can be configured to be trained using the second image generated by the method of the second embodiment.

DESCRIPTION OF THE DRAWINGS

For a fuller understanding of the nature and objects of the disclosure, reference should be made to the following detailed description taken in conjunction with the accompanying drawings, in which:

FIG. 23 is another exemplary coefficient matrix;

DETAILED DESCRIPTION OF THE DISCLOSURE

Although claimed subject matter will be described in terms of certain embodiments, other embodiments, including embodiments that do not provide all of the benefits and features set forth herein, are also within the scope of this disclosure. Various structural, logical, process step, and electronic changes may be made without departing from the scope of the disclosure.

Embodiments disclosed herein include systems, methods, and apparatuses for training deep learning and intelligent sensing system integration for autonomous ships.

An object detection network (ODN), which can include a convolutional neural network (CNN), can be trained to identify and classify objects in a real-time offline environment. The object detection network can be trained to operate a maritime vessel. Maritime objects can be identified and classified using the object detection network. The system can identify objects such as seashore, boats, ships, navigation safety hazards, icebergs, plain sea, and other maritime objects in real-time from the image feed received from cameras, RADARs, and/or the output from LIDARs. The system may further collect data including water current, wave height, wind velocity, water depth, distance from a static object, distance from a different maritime vessel, type of the moving vessel, and the velocity of the maritime vessel and other maritime vessel.

The system's maritime navigation map can be aided using an object detection network. The object detection network can be used to recognize various types of vessels and objects around the vessel, which can enable navigation in accordance with COLREGS. Object depth estimation using deep learning (e.g., the object detection network) on stereoscopic images can predict the context of the stereoscopic output disparity map and improve distance perception of various objects in the environment, for example, by obtaining the depth.

Figure 1:
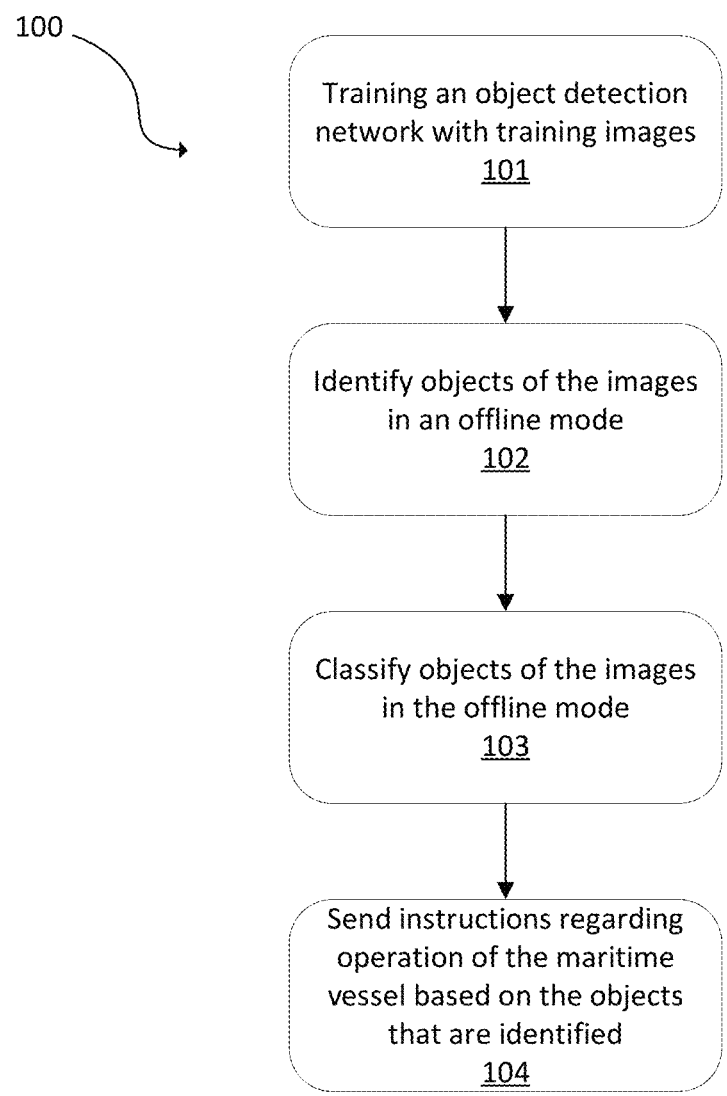
FIG. 1 is a flowchart of an embodiment of a method in accordance with the present disclosure.

FIG. 1 illustrates the method 100 of training an algorithm for controlling a maritime vessel. The method may include a series of steps, which may be conducted in an exemplary order, or in a different order as necessary for performing the method. Some or all of the steps of the method may be performed in an offline mode. A non-transitory computer readable medium can store a program configured to instruct a processor to execute some or all of an embodiment of the method 100.

At 101, a CNN (such as a CNN in the object detection network) is trained to identify and classify objects in stereo images with a set of training images. The training images can be provided to the CNN from a storage medium, such as a server. The CNN is optionally trained to send instructions regarding operation of a maritime vessel. Once trained, the CNN is optionally configured at to identify and classify objects in stereo images that are received from a sensor system. The CNN is optionally configured at to send instructions regarding operation of the maritime vessel based on the objects that are identified.

Figure 2:
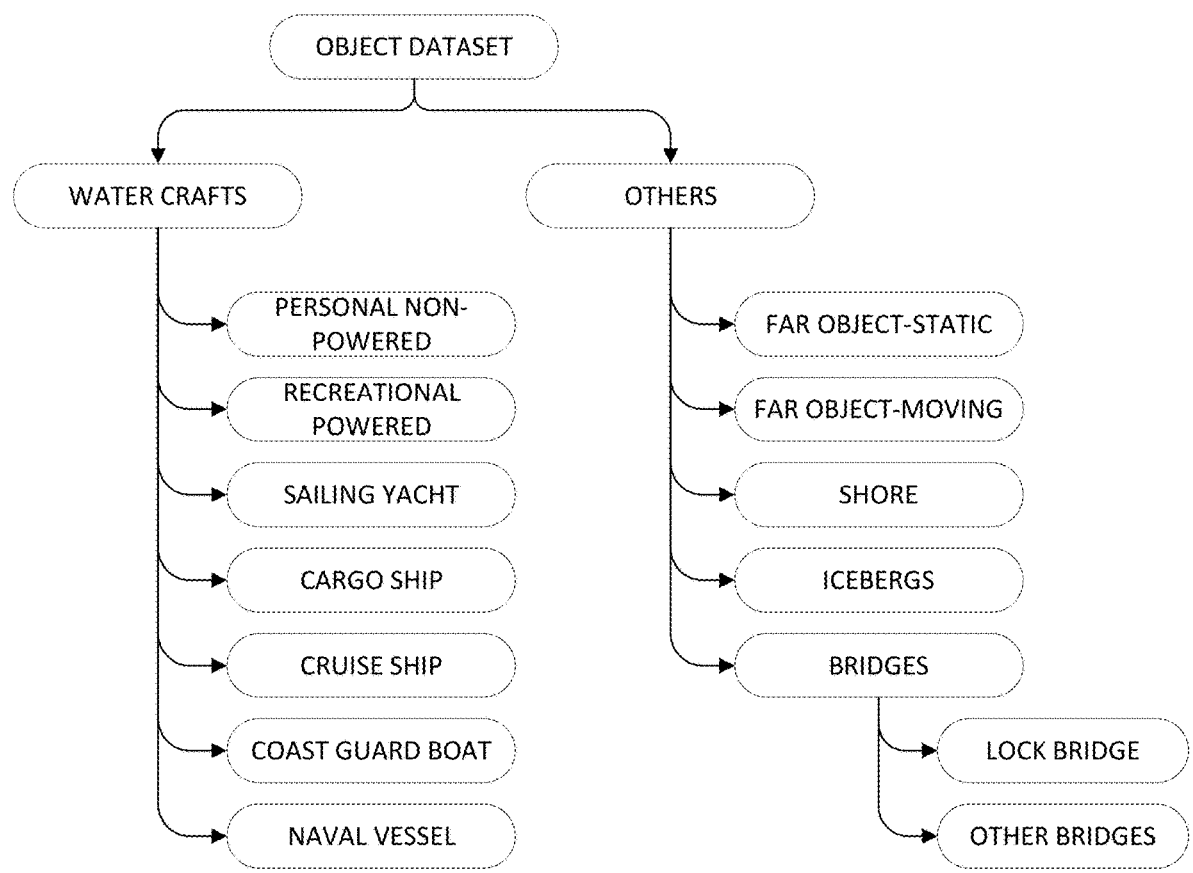
FIG. 2 is a chart showing exemplary object classification in accordance with the present disclosure.
Figure 3:
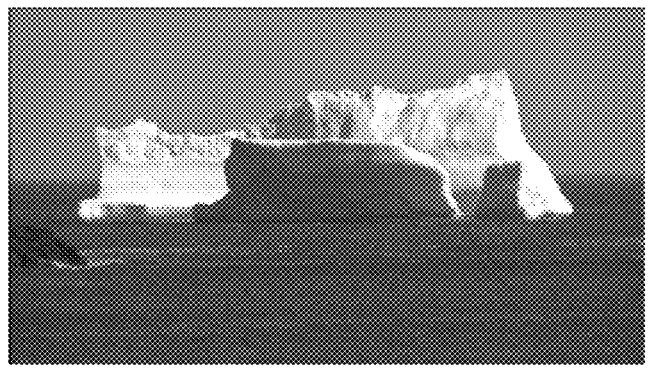
FIG. 3 illustrates exemplary image recognition in accordance with the present disclosure.
Figure 3:
Figure 3:
Figure 3:
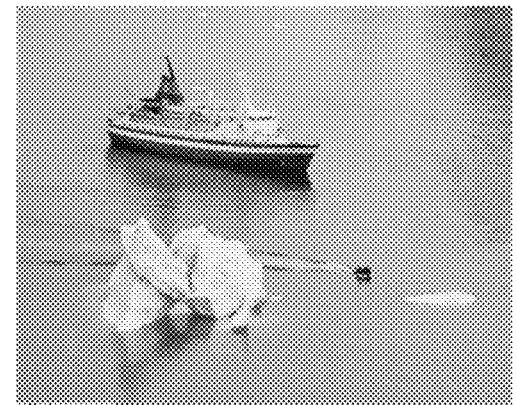

At 102, the method may further include identifying objects in the plurality of images. Identification 102 may be performed in an offline mode. The objects can include, for example, a seashore, a watercraft, an iceberg, a canal entrance, a lock gate, a bridge, a static far object, a moving far object, plain sea, or other objects. The watercraft can include a personal non-powered vessel, recreational powered vessel, sailing yacht, cargo ship, cruise ship, coast guard boat, naval vessel, barge, tugboat, fishing vessel, workboat, under-powered vessel, anchored vessel, or other vessels. The objects can also include people and other navigation safety hazards. FIG. 2 is a chart showing exemplary object classification. FIG. 3 illustrates exemplary image recognition results.

The method 100 may include receiving a plurality of images from a sensor system. The plurality of images may be received via stereo feeds, and the images may be created by transforming frames or parts of the stereo feed into images. Images may be produced from the devices, such as other cameras or thermal cameras, and fused into a single or multiple output disparity maps.

At 103, the method may further include classifying objects in the images. Classification 103 may be performed in an offline mode. A dataset can be collected by capturing images using multiple cameras attached to the ships. In an example, the images are classified using labels including, inter alia, powered boat, sailing yacht, cargo ship, cruise ship, coast guard boat, naval vessel, lock bridge, normal bridge, static far object, moving far object, icebergs, and shore. The different categories into which the dataset is to be labeled are described above. Given any image, the image is classified into one of the above categories. In addition, if there is an overlap between categories, classifying an image into one of the two categories is sufficient.

In an instance, images can be received by a trained neural network, such as an object detection network, image segmentation network, and object identification network. The neural network can be trained on the cloud. However, once trained, the neural network binary can be deployed to an offline system to identify objects across particular categories or classify the entire image. The neural network can provide a bounding box (e.g., x cross y) or other graphical shape (two-dimensional or three-dimensional) around an object in an image, which can size the object in the image using various methods, which may include using the diagonal length of the shape to infer size. The neural network also can provide a classification of the object in the bounding box with a confidence score.

Training a self-driving vessel to eliminate false positives can be a challenge. Since the decisions in maritime navigation are typically taken in advance when compared to the navigation of a car on the road, objects need to be identified at a distance. Identifying objects accurately at a distance is a challenge. In order to do so, we could create superficial categories like "Far Static Object" or "Far Moving Object" when they are detected at a distance and refine them to their actual categories like a "buoy" or a "canoe" when they get close enough for accurate classification.

Data can be taken during different times of the year in different places. In an embodiment, the system that collects data and the system responsible for navigating the ship are same, errors can be eliminated. Like problems caused due to irrelevant data, problems caused due to inappropriate sensors, problems caused due to incorrectly calibrated sensors, and problems due to unseen data can be reduced or eliminated. In other words, the apparatus used to gather machine learning data is the same one that is deployed after the training is completed. The same sensors can be installed in similar positions and orientations in any given vessel.

FIG. 3 illustrates exemplary images having confidence scores determined. For example, objects in image 301 may be classified, yielding scored results of 0.99535 for "iceberg," 0.00358 for "ocean," and 0.00108 for "boatship." Objects in image 302 may be classified, yielding scored results of 0.00255 for "iceberg," 0.97706 for "ocean," and 0.02040 for "boatship." Objects in image 303 may be classified, yielding scored results of 0.00701 for "iceberg," 0.00162 for "ocean," and 0.99137 for "boatship." Objects in image 304 may be classified, yielding scored results of 0.20249 for "iceberg," 0.79449 for "ocean," and 0.00302 for "boatship."

The identification and the classification can include using a CNN in the form of an object detection network, image segmentation network, or an object identification network. A CNN or other deep learning module in the object determination network can be trained with at least one set of images. As disclosed herein, a CNN is a type of feed-forward artificial neural network in which the connectivity pattern between its neurons (i.e., pixel clusters) is inspired by the organization of the animal visual cortex. Individual cortical neurons respond to stimuli in a restricted region of space known as the receptive field. The receptive fields of different neurons partially overlap such that they tile the visual field. The response of an individual neuron to stimuli within its receptive field can be approximated mathematically by a convolution operation. CNNs are discussed in more detail later herein.

The object classification network can perform operations like a scene classifier. Thus, the object classification network can take in an image frame and classify it into only one of the categories. An example of this includes receiving an input from the cameras and classifying the inputs as that of nighttime images or that of a heavy sea state.

In one embodiment, three neural networks may be used. One neural network identifies objects in images, one neural network segments the image into regions that need to be classified, and another neural network classifies objects identified by the first neural network. Three neural networks may provide improved object detection speed. Three neural networks also can classify the whole scene in the image, including time of the day (e.g., dawn, dusk, night), the state of the vessels, if vessels in front are moving or static, and/or classify the watercraft or other objects identified by the object detection network.

In another embodiment, two neural networks may be used. One neural network identifies objects in images and another neural network classifies objects identified by the first neural network. Two neural networks may provide improved object detection speed. Two neural networks also can classify the whole scene in the image, including time of the day (e.g., dawn, dusk, night), if vessels in front are moving or static, and/or classify the watercraft or other objects identified by the object detection network.

In another embodiment, a single neural network may identify objects in an image and classify these objects. In the embodiment with a single neural network, a second validation neural network can optionally be used for verification of the identification and classification steps. Use of a single neural network may provide sufficient results to operate a vessel.

At 104, the method may further include sending instructions regarding operation of the maritime vessel based on the objects identified. The instructions can enable navigation in accordance with COLREGS and any other navigation safety procedures imposed locally by an inland navigation authority, such as a port or river authority. The instructions may include, inter alia, an instruction to adjust a speed or a heading of the maritime vessel. Instructions may alternatively, or also, include instructions to adjust propeller pitch, a bow thruster, a stern thruster, an azimuth thruster, the state of anchoring, the state of mooring, or the position of a rudder of a larger maritime vessel. For a smaller maritime vessel, such as, for example, a speedboat, the instructions may include instructions to adjust the main thruster, azimuth thruster, pitch of a motor, or a rudder. Additionally, instructions may include suggestions to a pilot, helmsman, or captain to make any of these adjustments.

The instructions to operate the vessel may not be provided by the object detection network. Rather, a separate algorithm may be used to send the instructions. The object detection network may provide weights to a grid over a nautical map, which may include a three-dimensional map constructed with LIDAR, RADAR, automatic identification system (AIS), and/or camera inputs via sensor fusion, which can then be used to make path or route changes.

In addition, other sources of input may be used to provide or send instructions for operation of the maritime vessel by the path planning algorithm. For example, RADAR, LIDAR, compass heading, GPS, other camera feeds, sonar, vessel specifications, safety alerts or bulletins, information from neighboring vessels, sea conditions (e.g., tide, swells, etc.), anemometer, bolometer, ultrasound proximity sensor, microphone, infrared camera, and/or weather reports (e.g., wind speed, weather bulletins or alerts, or long-term weather forecasts) also can be used by the processor. The object detection network can use these inputs to determine instructions.

The method may further include performing stereoscopy. The stereoscopy may be performed in an offline mode. The stereoscopy may include the process of creating an input disparity map, which may use a CNN to interpret and adjust the map based on context in the scene. In this way, the stereoscopy can be used for depth estimation or distance estimation. Two or more cameras may be used to perform stereoscopy, with appropriate lensing and inter-focal length.

The method may further include generating heat maps. The heat maps may be generated in an offline mode. Overlapping heat zones created by the 3D image on the navigation map may be used to determine route feasibility. The heat map generation can be optimized to run with GPUs. A neural network that generates heat maps can be trained with marine application datasets. Cameras can provide image data for the heat maps, and may provide images of objects at various distances from the maritime vessel.

In an instance, a multidimensional (e.g., a two-dimensional) grid map can contain navigation information. Each square in the grid has a weight. A higher weight may mean the vessel should try to avoid the square with more urgency. The path of the vessel can be modified depending on these weights. The weights can change dynamically based on objects that are identified and/or classified. A path-planning algorithm can be employed to determine the most feasible path based on the weights.

The method may further include estimating object depth. The object depth may be estimated in an offline mode. Estimating the object depth may be accomplished by generating a disparity map and obtaining an object depth, which may be the object's distance from the vessel. This may involve inferring the distance of multiple objects in the environment. Training can be performed using techniques such as those disclosed in "Stereo Matching by Training a Convolutional Neural Network to Compare Image Patches" by Zbontar and LeCun (submitted 2015), the disclosure of which is incorporated by reference in its entirety.

Figure 7:
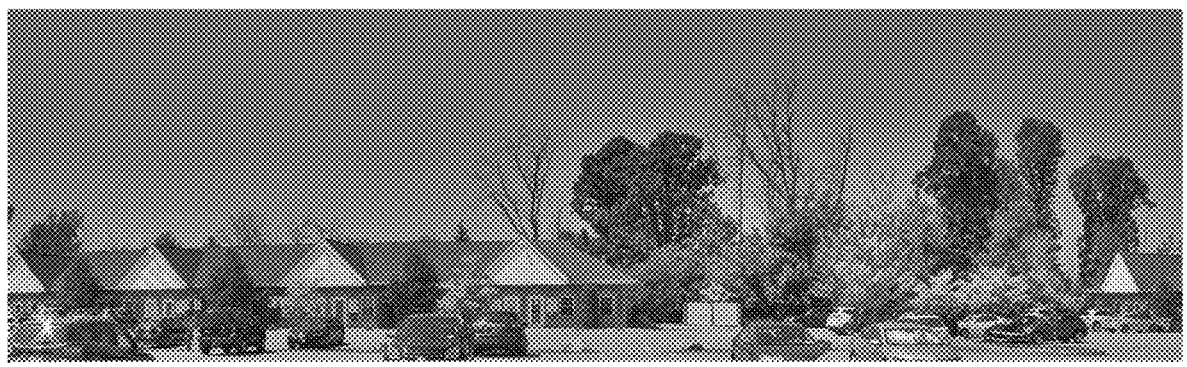
FIG. 7 is an exemplary image and depth map illustrating depth estimation.
Figure 7:
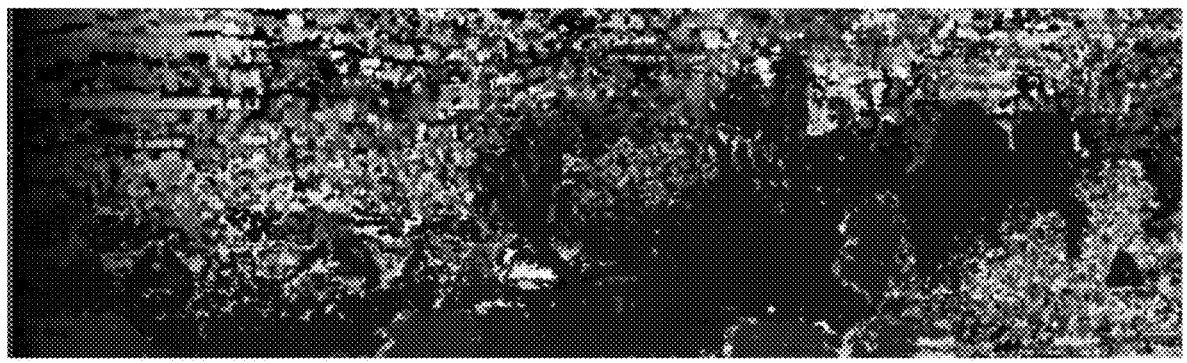

In an instance, FIG. 7 is an exemplary image 701 and depth map 702 illustrating depth estimation, wherein image 701 is turned into disparity map 702 to determine object depth. Disparity depth map 702 can use shading to depict how far the matter depicted in each pixel is from the camera.

Figure 8:
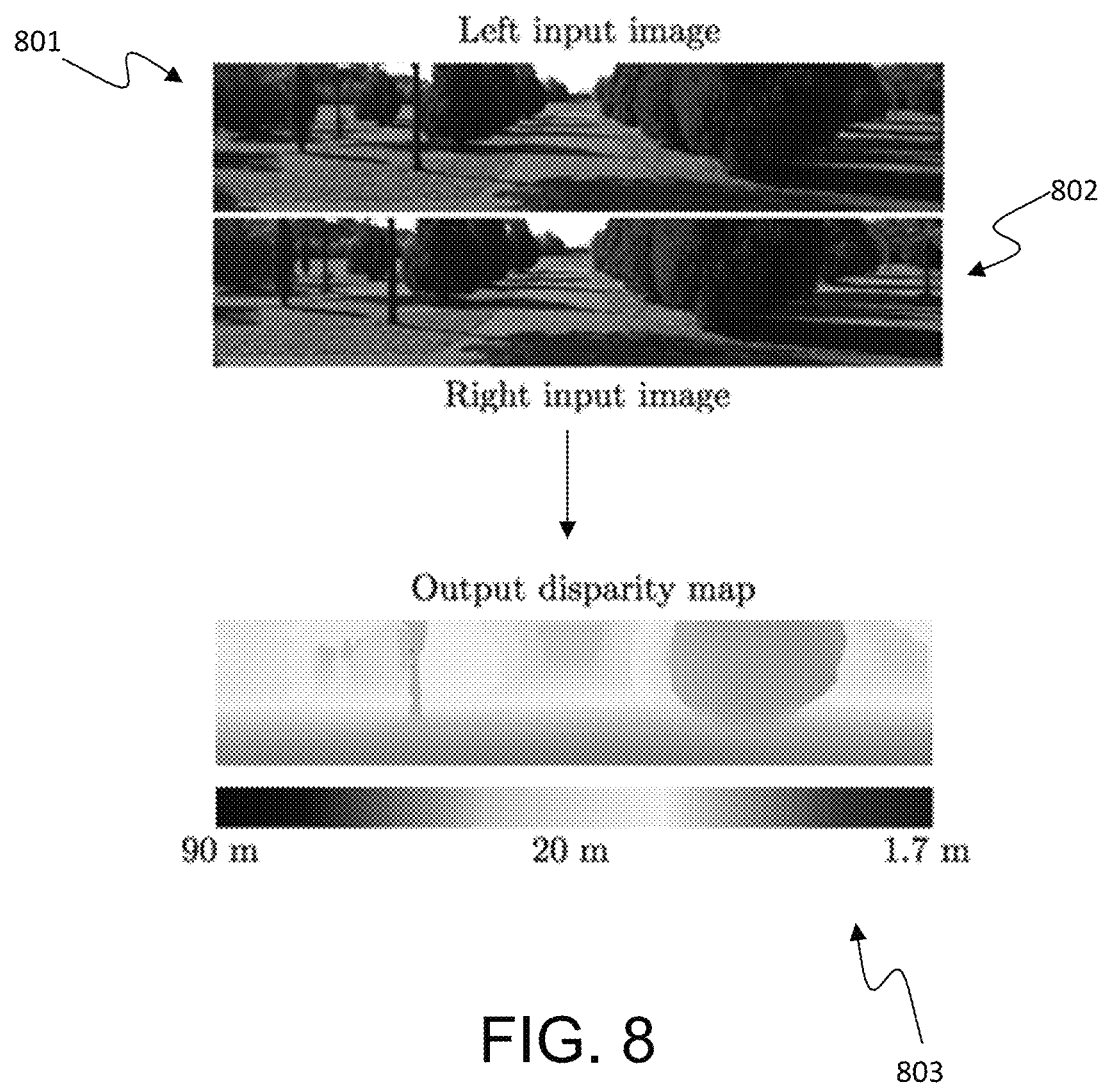
FIG. 8 illustrates object depth determination.

In another example, stereo matching can be used. A CNN can be trained to compare image patches for stereo matching. FIG. 8 illustrates object depth determination.

Multiple stereo cameras can provide image input in the form of a visual sensor. A stereoscopic image pair can be used to obtain the depth information of objects in the image. This can help determine the distance of the other watercrafts from the maritime vessel being controlled by the processor in the embodiments disclosed herein.

Alternatively, the visual sensor can be a monocular visual sensor, and may be paired with other sensors, such as LIDAR and/or RADAR.

Matching cost computation can be performed. First, the solution can learn a similarity measure on small image patches using a CNN. Training is carried out in a supervised manner by constructing a binary classification data set with examples of similar and dissimilar pairs of patches. Experimentation on the algorithm may be needed to obtain the right balance between accuracy and speed needed for autonomous watercraft navigation. The output of the CNN can be used to initialize the stereo matching cost.

A series of post-processing steps can then be performed: cross-based cost aggregation, semi-global matching, a left-right consistency check, subpixel enhancement, a median filter, and a bilateral filter. While post-processing steps can have drawbacks, post-processing steps may be necessary to achieve desired results. Matching costs can be combined between neighboring pixels with similar image intensities using cross-based cost aggregation. Smoothness constraints can be enforced by semi-global matching. A left-right consistency check can be used to detect and eliminate errors in occluded regions. Subpixel enhancement can be performed and a median filter and a bilateral filter can be applied to obtain the final disparity map.

In another instance, FIG. 8 illustrates depth estimation using stereoscopic images 801 and 802 and resulting in disparity map 802 via stereo matching, or stereoscopy. It should be noted that for other embodiments, stereoscopic images may be, for example data from a monocular visual sensor paired with other sensors, such as LIDAR and/or RADAR. A CNN can be trained to compare image patches for stereo matching, or stereoscopy. The object depth can be determined by predicting disparity map 802 and obtaining the object depth. This can be performed using techniques such as those disclosed in "Stereo Matching by Training a Convolutional Neural Network to Compare Image Patches" by Zbontar and LeCun (submitted 2015), the disclosure of which is incorporated by reference in its entirety. In this way, an object depth estimation can be performed via deep learning (for example, the CNN in the object detection network) using stereoscopic images 801 and 802 to obtain the depth of each object in stereoscopic images 801 and 802.

The disparity map can use shading to depict how far the matter in each pixel is from the camera.

The distances of one or more objects in an environment may also be inferred. This inference may be performed based on known properties of known objects.

The method may further include determining a route feasibility, which can provide a determination of whether a path to a destination is feasible, and the route feasibility may be determined in an offline mode. The route feasibility may be determined based on a heat map.

The method may further include generating a navigation policy. The navigation policy may be part of the instructions generated at 104, or may be used to generate the instructions at 104. Alternatively, generating a navigation policy may be part of determining route feasibility, or a generated navigation policy may be used to determine a route feasibility. The navigation policy may be generated in an offline mode. In an instance, a navigation policy may make a map appear infeasible if navigation is not possible. A navigation policy can keep a vessel compliant with COLREGS or other national or local navigation requirements, where applicable. Alternatively, different navigational requirements or liberties may be embedded in the navigation policy for, inter alia, navy or coast guard vessels.

In some embodiments, the determined route feasibility and generated navigation policy can be used for navigating complex routes. Where simpler routes are required, such as navigating between two points in a region lacking obstructions or objects, e.g., open sea, the mapping function may be avoided.

The objects detected can include a variety of objects a maritime vessel may encounter. Such objects may include a seashore, a watercraft, an iceberg, a static far object, a moving far object, or plain sea. The watercraft may include a personal non-powered craft, a recreational powered craft, a sailing yacht, a cargo ship, a cruise ship, a coast guard boat, or a naval vessel.

The objects may be identified and classified using an object detection network, which may employ machine learning. In an instance, the machine learning may employ a CNN.

Figure 4:
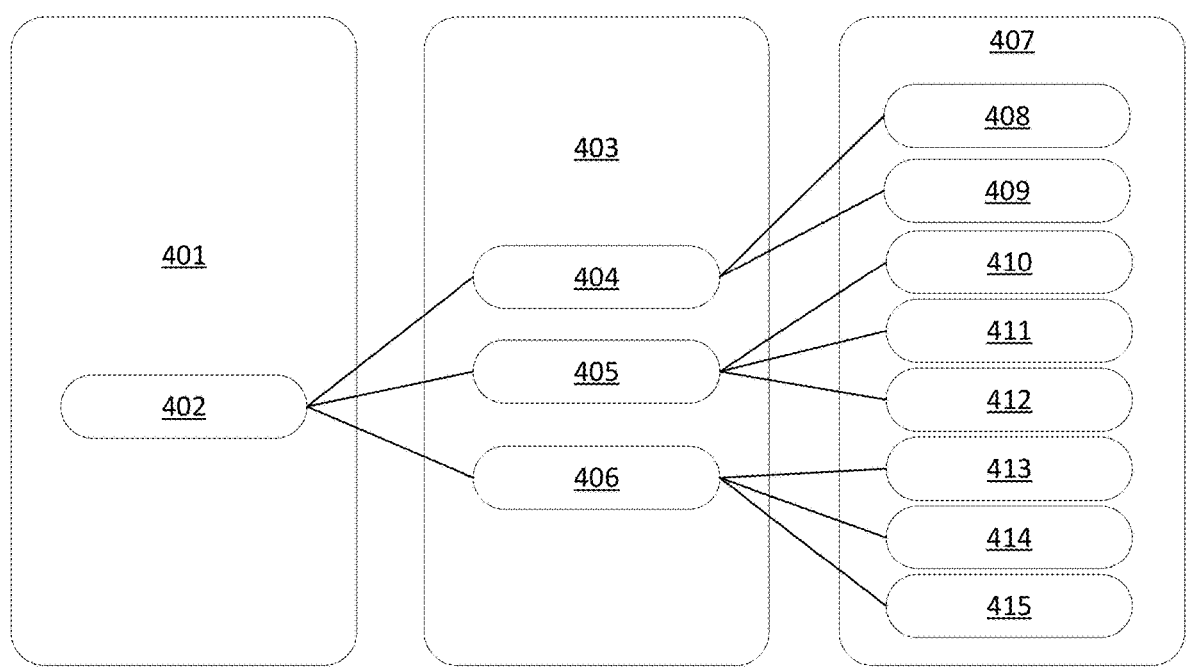
FIG. 4 is a diagram of a situational awareness system in accordance with the present disclosure.

FIG. 4 is a diagram of an example situational awareness system 400 in accordance with an embodiment. At 401, a map may display a vessel in proportionate size and show all other objects around it. The map may have zoom capability using two-finger expansion and/or contraction. The map may have a grid overlay function with options for changing grid size in the graphical user interface. The depth of the matter represented in each pixel on the map may be color coded. For example, depth greater than 80 feet may be light blue and gradually progress to darker shades of blue until those areas less than 40 feet in depth are black. Land may be represented as yellow, the vessel navigating may be light green, and other vessels may be red. As such, a two-dimensional grid map 402 is enabled.

At 403, cameras may be prioritized for object classification and matched with AIS data. Camera data may be used to infer vessel status based on navigation light patterns and flags displayed by other vessels. A microphone may be used to detect honking by vessels alerting on their intention to make a particular maneuver. At this stage, detection and ranging 404, classification 405, and the creation of the primary map 406 may occur.

At 407, LIDAR and RADAR may be used to define contours of other objects in the map. LIDAR data may be prioritized over RADAR except, for example, during rain, snow, or fog. This is accomplished using LIDARs 408, RADARs 409, cameras 410, AIS receiver 411, microphone 412, a marine traffic API 413, a nautical chart 414, and a satellite compass 415.

Figure 5:
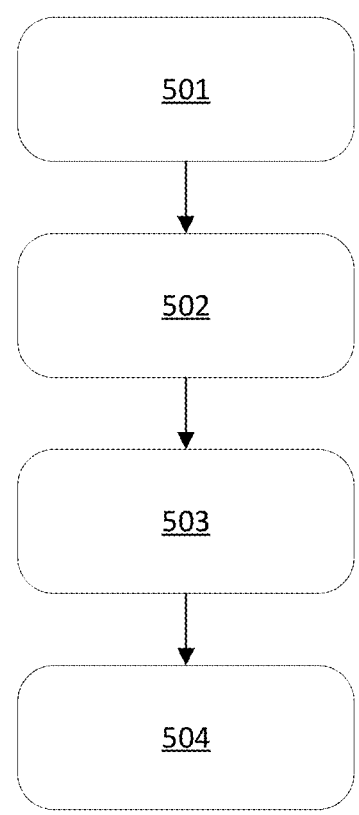
FIG. 5 is a diagram of an operational embodiment in accordance with the present disclosure.

FIG. 5 is a diagram of an example operational embodiment 500. Note the arrows between the localization 501, mapping 502, path-planning 503, and actuation 504 steps. These iterations can repeat at a particular frequency. These iterations can continually change, and the frequency of the iteration can vary. For example, the iterations can change at a higher rate for objections or distances closer to the vessel. Thus, the frequency will be less at a distance farther from the vessel than more proximate the vessel.

At localization 501, a GPS position is received. A current yaw, pitch, and roll of the vessel are determined. The vessel is also located on a nautical chart.

At mapping 502, the vessel and its trajectory based on current attitude is plotted on a nautical map. The map is populated with RADAR signatures. The map is populated with AIS messages, and populations are annotated using a vision sensor.

At path-planning 503, constraints are defined based on populated areas. Constraints of future trajectories are added based on the current attitude of all populations. COLREG maneuver constraints are added based on annotations of the population. A path is determined based on A* path planning. A* path planning comprises the process of finding a path between multiple points/nodes.

At actuation 504, a difference between actual attitude and planned attitude is determined. The steering and thrust of the vessel are then actuated until the difference is minimized.

Figure 6:
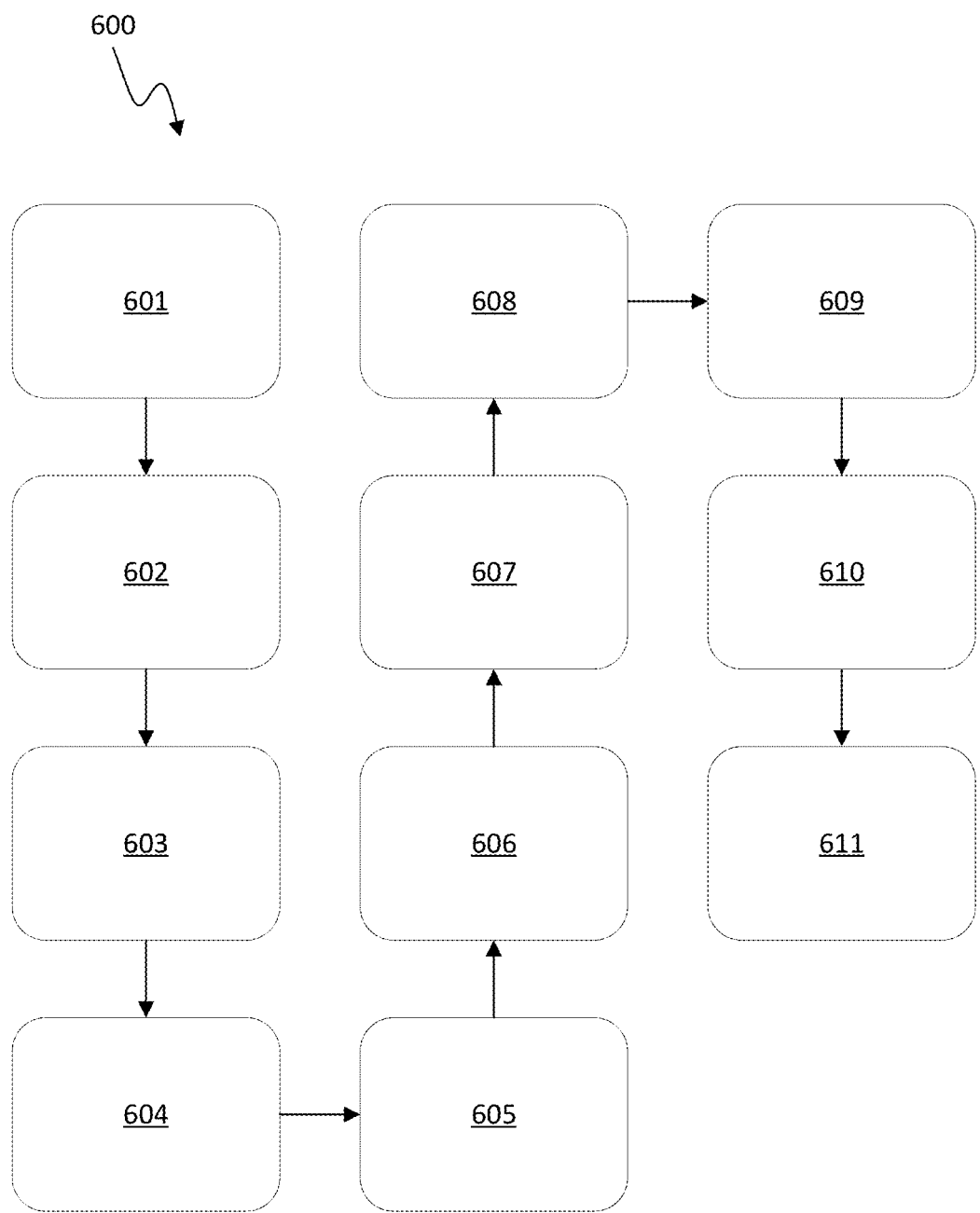
FIG. 6 is a flowchart of a situational awareness system in accordance with the present disclosure.

FIG. 6 is a flowchart of an example situational awareness system 600 in accordance with an embodiment. At 601, a GPS position is obtained. At 602, a stored nautical chart for 10×10 nautical miles around the GPS position is obtained. At 603, static objects and depth information from the nautical chart may be used to populate the map. At 604, AIS receiver data for 10×10 nautical miles around the GPS position is obtained. At 605, the AIS receiver data is populated on the map. If internet access is available, at 606, the map is compared with the local marine traffic authority's map and missing information is added to the map. At 607, LIDAR data is obtained and used to populate the map. At 608, RADAR data is obtained and used to populate the map. At 609, objects on the map are annotated based on camera data. At 610, duplicate objects are removed and error checks are run. At 611, a consolidated two-dimensional map is displayed on the monitors.

In another embodiment, as illustrated in a system includes a sensor system and a processor for deep learning and intelligent sensing system integration for autonomous ships. The sensor system may be disposed on the maritime vessel and may be used to collect data used to navigate the maritime vessel. The data may be collected using a variety of inputs, and may include a plurality of images. Such inputs may include, inter alia, a stereoscopic camera, a RADAR system, or a compass.

A stereoscopic camera as employed in some embodiments may include one or more individual camera systems configured to collect stereoscopic images. A stereoscopic camera as employed herein may include two or more lenses and one or more images using sensors configured to collect a stereogram by employing stereopsis. The distance to each point in the field of view can thus be determined based on calculating the disparity in position at each lens.

In an example, the sensors that are deployed include a stereoscopic marine cameras, a satellite compass, a gyro compass, and/or RADAR. A router can be in electronic communication with the sensors. These particular components are merely examples, and other similar components can be used. A control unit or CNN may be in electronic communication with some or all of these sensors. The control unit or CNN also may be in electronic communication with other types of sensors.

Some of the sensors can use customized marine communication protocols that are incompatible with a Windows and other PC operating systems. Therefore, these sensors can be integrated using third-party converters and drivers. Other types of software can be used instead of the software listed in this example.

Figure 9A:
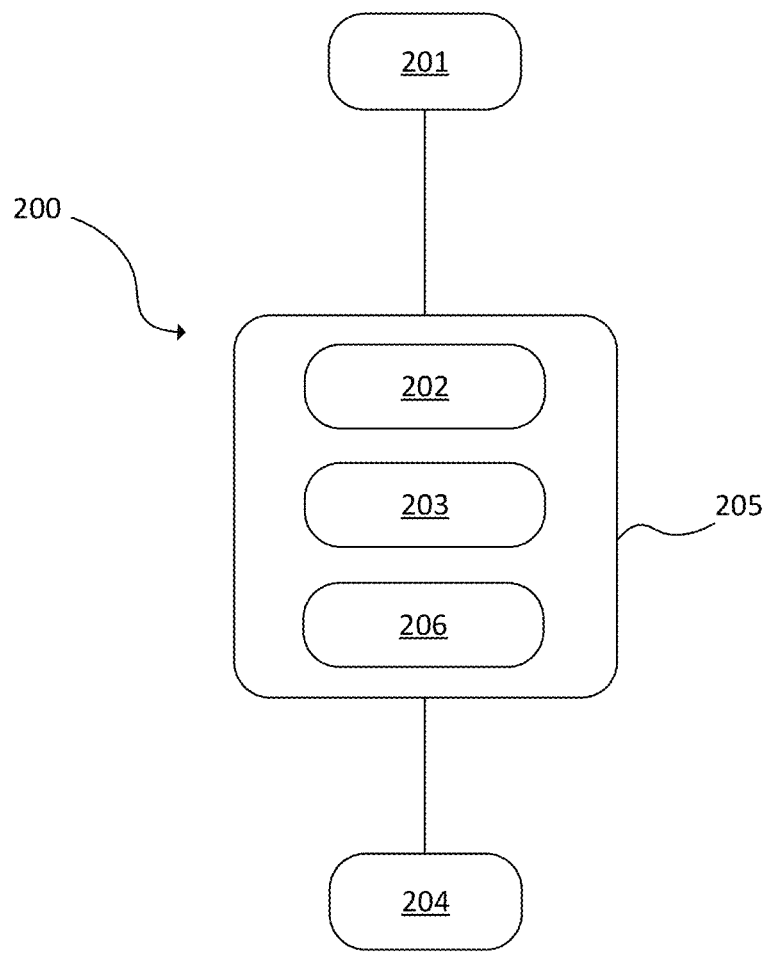
FIG. 9A is a block diagram of a system in accordance with the present disclosure.
Figure 9B:
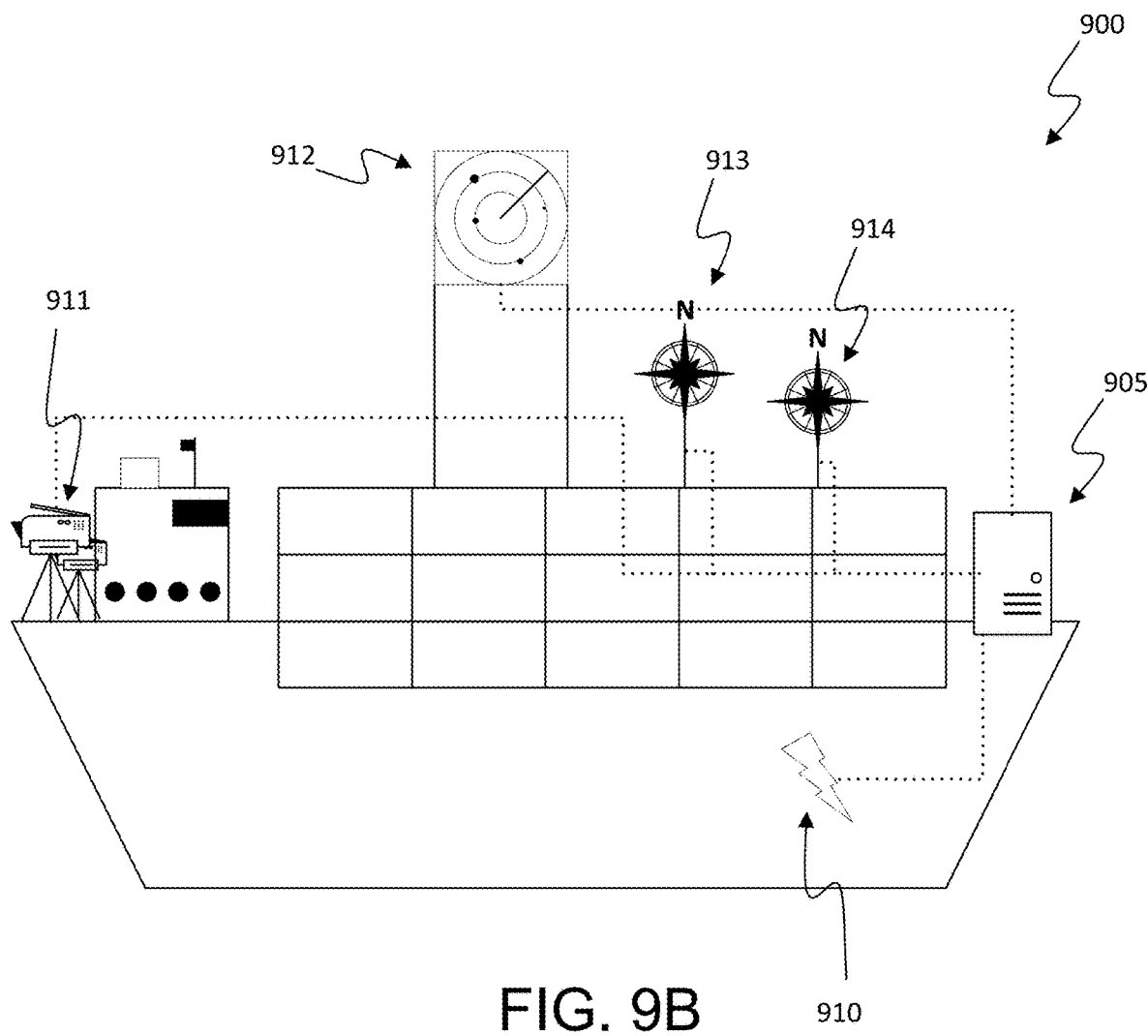
FIG. 9B illustrates exemplary data collection and hardware connections.
Figure 10:
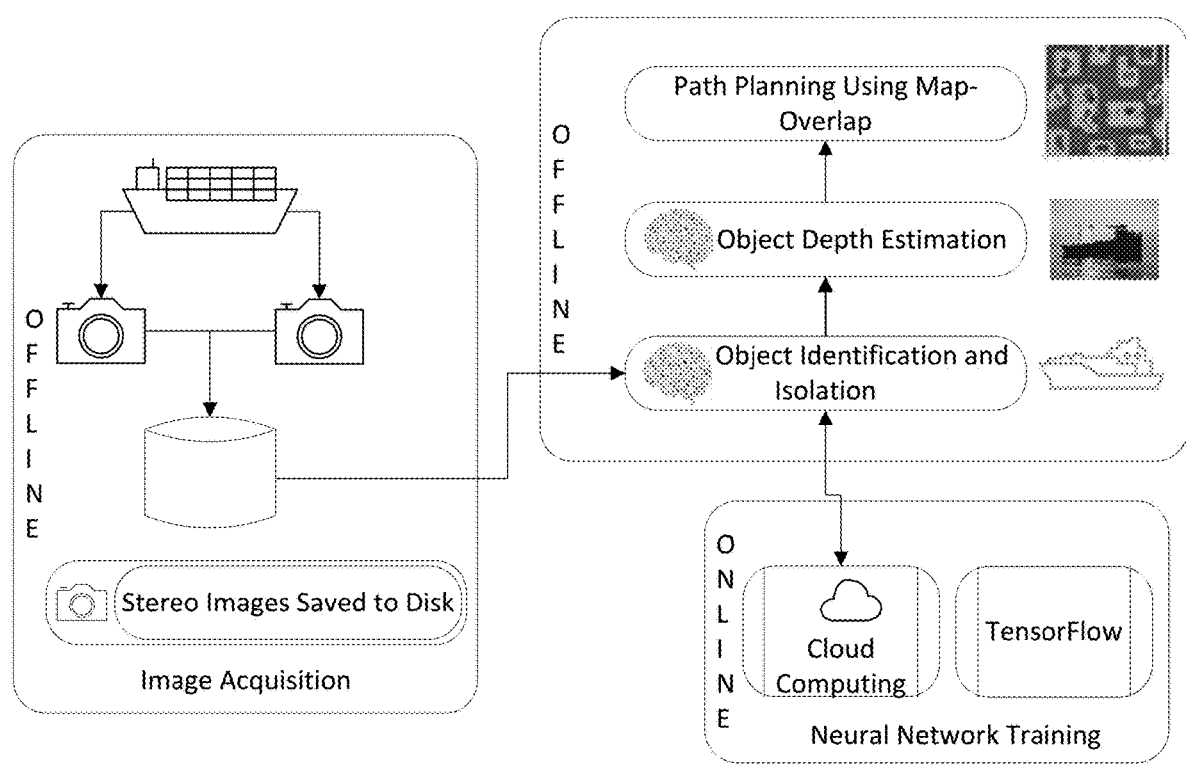
FIG. 10 is a diagram showing a high-level architecture in accordance with the present disclosure.

Different sensors may be mounted at different locations on the ship, and the sensor may be connected to a control unit using, inter alia, NMEA 2000, Ethernet, and/or CAN. Various drivers read the incoming data and record it into a connected memory. FIG. 9B illustrates exemplary data collection and hardware connections. FIG. 9A is a block diagram of a system 200. The CNN can be created and trained to identify and classify objects in a real time offline environment. In simple terms, the system can identify seashore, boats, ships, icebergs, plain sea and other possible maritime objects in real time based on an image feed from the cameras.

Weather information also can be determined. Wind speed can be determined from an ultrasound anemometer or other devices. Other weather information can be transmitted to the processor.

A processor may be in electronic communication with the sensor system 200. The processor may be configured to receive a plurality of images from the sensor system and execute one or more of the steps of method 100.

An electronic storage device may be provided to store data used in the identification and classification. The dimensions, characteristics, or profiles of the objects may be stored thereon in a library of entries. Additional information that can be stored may include sensor readings, videos, measurements, navigation setting for the vessel, or other data. Such data may be encrypted and may include a digital signature. This data can be used to develop a profile of the vessel, for navigation, for training of personnel, for training of machine learning modules, or for other useful purposes. This data can also be used for example, for insurance claims or for other investigations.

FIG. 9A is a block diagram of a system 200 and FIG. 9B is a diagram showing a high-level architecture in accordance with the present disclosure. The system 200 in FIG. 9A includes a control unit 205, such as the control unit 205 seen in FIG. 9B. The control unit 205 includes a processor 202 and a memory 203, and may be powered by power supply 910. The control unit 205 is in electronic communication with sensors and other devices, represented by the box 201. Such sensors may include marine stereo cameras 911, RADAR 912, satellite compass & GPS 913, and gyro compass 914. The control unit 205 also is in electronic communication with a maritime vessel control system 204. The control unit 205 also may be in electronic communication with a power supply (not illustrated).

The box 201 can include a sensor system disposed on the maritime vessel. For example, the sensor system can include a pair of stereoscopic cameras, a RADAR system, and a compass. Other components, such as those disclosed herein, are possible.

The processor 202 is configured to receive images from the sensor system, identify objects in the images in an offline mode, classify objects in the images in the offline mode, and send instructions regarding operation of the maritime vessel based on the objects that are identified. The processor 202 can send instructions to the maritime vessel control system 204, which can control speed, steering, and other functions of the maritime vessel. The instructions can enable navigation in accordance with COLREGS.

The processor 202 can be configured to perform stereoscopy, generate heat maps, and/or estimate object depth. These functions can be performed in an offline mode. Object depth can be estimated by predicting a disparity map and obtaining the object depth. The processor 202 also can be configured to infer the distance of multiple objects in an environment.

The processor 202 can be configured to determine or predict route feasibility, which can be performed in an offline mode.

The processor 202 can be configured to determine a navigation policy, which can be performed in an offline mode.

The control unit 205 can include a deep learning module 206 (e.g., an object detection network module) and/or the processor 202 can be configured to operate a deep learning module 206. For example, the deep learning module 206 can be stored on the memory 203. Thus, the processor 202 can include TensorFlow layers. One or more of receiving the identifying the objects, classifying the objects, and sending the instructions can be based on a CNN.

The deep learning module 206 can include a CNN with other algorithms or software components before and/or after the CNN. For example, Resnet can be used before or after the CNN.

One or more of identifying the objects, classifying the objects, and sending the instructions includes training the CNN with a set of training images.

The deep learning module 206 (e.g., the CNN module) can be trained. For example, the deep learning module can be trained to identify and classify objects in images. The deep learning module 206 also can be trained to send instructions regarding operation of a maritime vessel, estimate distances or depths in stereo images, or develop a route for a maritime vessel.

During training, algorithms can be used to clean images for maritime applications. All training categories can be given equal importance. Thus, open sea can be equally important as an iceberg. A parallel, multi-threaded algorithm can be used for this technique.

All videos from the various sensors can be converted to images and compared to other images. Unique images can be found. A degree of desired uniqueness can be tuned by adjusting a uniqueness factor. This can be used to generate a dataset. Most plain sea images can be removed from the dataset so that the dataset is not overwhelmed with open sea images. The number of open sea images may be approximately equal to the number of, for example, boat or iceberg images.

The classification of the images in the training dataset can be verified.

The processor 202 may be in communication with and/or include a memory 203. The memory 203 can be, for example, a Random-Access Memory (RAM) (e.g., a dynamic RAM, a static RAM), a flash memory, a removable memory, and/or so forth. In some instances, instructions associated with performing the operations described herein (e.g., the method 100) can be stored within the memory 203 and/or a storage medium (which, in some embodiments, includes a database in which the instructions are stored) and the instructions are executed at the processor 202. The memory 203 can include a library of entries.

In some instances, the processor 202 includes one or more modules and/or components. Each module/component executed by the processor 202 can be any combination of hardware-based module/component (e.g., a field-programmable gate array (FPGA), an application specific integrated circuit (ASIC), a digital signal processor (DSP)), software-based module (e.g., a module of computer code stored in the memory 203 and/or in the database, and/or executed at the processor), and/or a combination of hardware- and software-based modules. Each module/component executed by the processor 202 is capable of performing one or more specific functions/operations as described herein. In some instances, the modules/components included and executed in the processor 202 can be, for example, a process, application, virtual machine, and/or some other hardware or software module/component. The processor 202 can be any suitable processor configured to run and/or execute those modules/components. The processor 202 can be any suitable processing device configured to run and/or execute a set of instructions or code. For example, the processor can be a general purpose processor, a central processing unit (CPU), an accelerated processing unit (APU), a field-programmable gate array (FPGA), an application specific integrated circuit (ASIC), a digital signal processor (DSP), and/or the like.

The component(s), e.g., component(s) shown in FIG. 9A, executed by the processor 202, can include a deep learning module 206 (e.g., a CNN module configured to execute one or more of the steps of method 100). The processor 202 may further include a TensorFlow module configured to execute one or more of the steps of method 100. The deep learning module 206 can have one of the configurations described further herein. Rooted in neural network technology, deep learning is a probabilistic graph model with many neuron layers, commonly known as a deep architecture. Deep learning technology processes the information such as image, text, voice, and so on in a hierarchical manner. In using deep learning in the present disclosure, feature extraction is accomplished automatically using learning from data. This is advantageous over previous approaches, which extract features based on experts' understanding of a set of images. For example, objects in images can be classified using the deep learning module based on the one or more extracted features.

In another embodiment, a non-transitory computer-readable storage medium may be configured to store a program that can instruct a processor to execute one or more of the steps of method 100.

Offline mode can mean that the control unit 205 or processor 202 does not rely on internet from outside the vessel. Thus, the control unit 205 or processor 202 may be connected to the vessel's Wi-Fi, which can provide connections to sensors, vessel systems, or other measurement devices. While the offline mode may not rely on internet from outside the vessel, this does not include GPS, AIS, or satellite compass data. The control unit 205 may cache the last data in offline mode, but can operate without an internet connection.

Operating in offline mode poses particular challenges. First, one ship's neural network cannot learn from the experiences of other ships. Thus, if one ship sees something unique it cannot quickly update the information to the entire fleet. Second, offline mode reduces computing power because access to the cloud is lost. The neural network may need to run on a mid-range GPU without a latency. Third, existing online API services cannot be used for object detection. Fourth, intense computations like data pre-processing and training cannot be done inside the vessel.

Offline mode can be overcome by storing data locally onto the ships on, for example, 20 TB hard disks or other large storage units. The hard disks can be physically extracted when they reach the port. The data from all the ships can be uploaded onto the cloud and a series of pre-processing may be done to keep only one copy of a similar experience but keep all copies of unique experiences. Then the data may be sent for annotation. The neural network can be trained on the new set of data and the binary file is created which is deployed back onto the ship over the air when the ship is in port.

Figure 11:
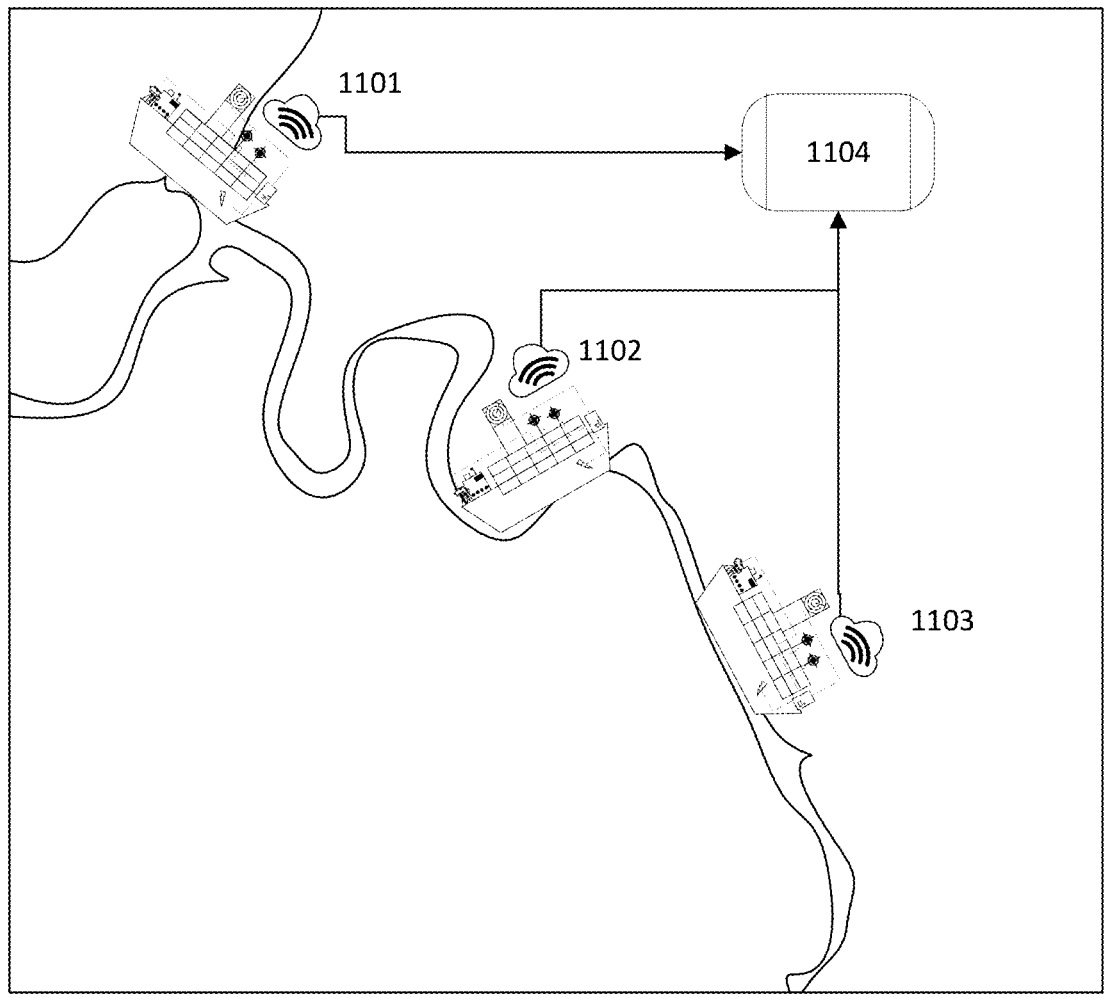
FIG. 11 illustrates an exemplary data collection plan.

With respect to data collection, a synchronizing software can update the cloud with the data present in the onboard hard disk. For example, the Intel NUC computer present in the ship may be connected to the internet using a mobile internet dongle present in the ship and/or using ports' Wi-Fi when a ship docks for loading and/or unloading. FIG. 11 illustrates an example data collection plan. In this way, multiple vessels 1101, 1102, and 1103 having connections via port or mobile internet may communicate with a cloud server 1104.

Figure 12:
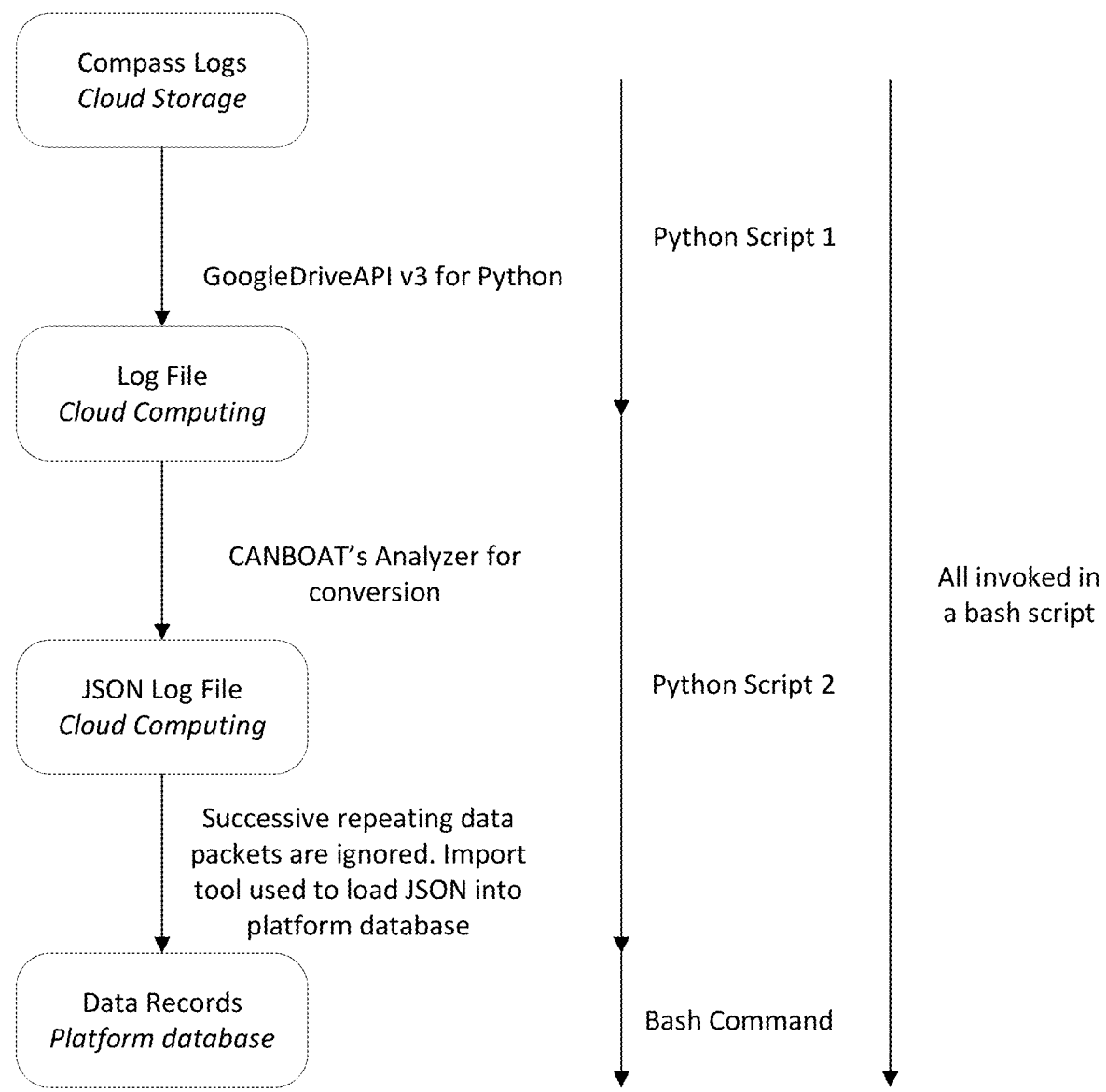
FIG. 12 is a diagram of a data pipeline.

FIG. 12 is a diagram of a data pipeline. In an instance, the data collected by an Actisense Device is pushed to cloud storage from the on-board computer. The data pipeline processes this data from cloud storage and imports it into a platforms database, such as, for example, MongoDB, using, for example, Python and Bash scripts. The whole process is described in FIG. 12. The whole process can be invoked in a continuously running script in a virtual machine in a cloud computing system. For each log file in cloud storage, or other cloud computing system, the following happens as the Bash script is called. A file is downloaded from cloud storage to cloud computing using, for example, Google-DriveAPI v3 for Python. This is done in Python Script 1. The downloaded log file is converted to JSON using CAN-BOAT's Analyzer. This is done in Python Script 2. Each data packet is checked with the previous packet if any of the same "msg_type." If the new packet contains the same data as the previous packet it is ignored. If not it is added to a JSON file and set as the previous packet. Only the first occurring data packet of each second is considered for each "msg_type." At the end of processing of the file the previous state is saved as a separate JSON and used for subsequent file. This is also done in Python Script 2. Using mongoimport the data in the JSON file created is loaded into the platforms database. All supporting files created are removed. Once all the files in cloud storage for the particular ship and pole are downloaded the Bash script sleeps for five minutes and looks for new files uploaded to cloud storage.

Figure 13:
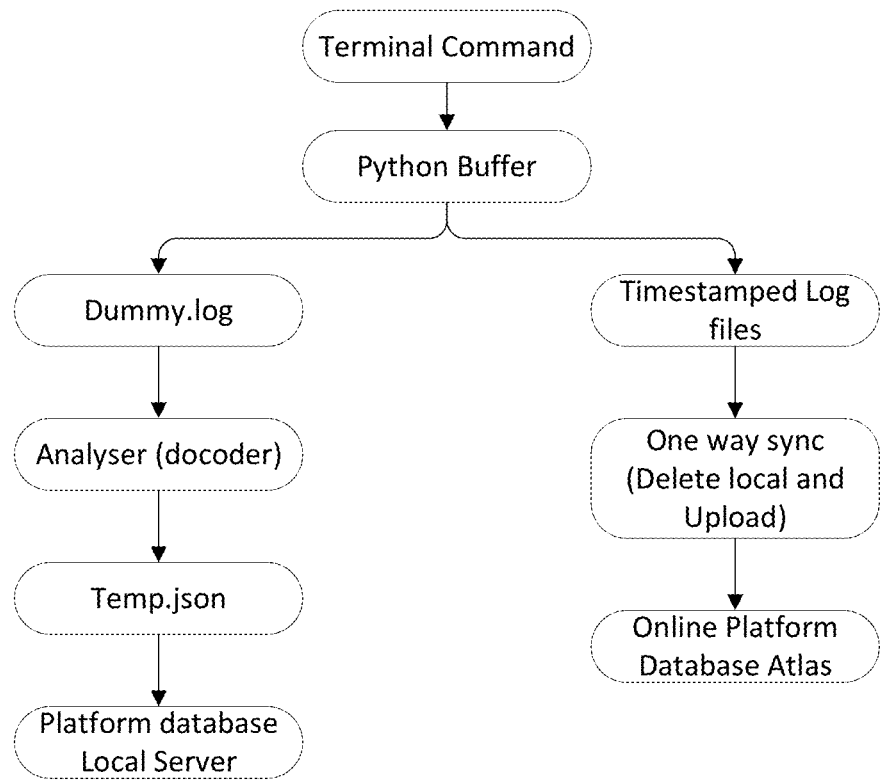
FIG. 13 is a diagram related to log files.
Figure 14:
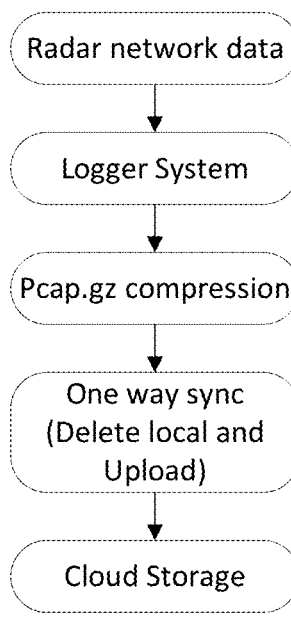
FIG. 14 is another diagram related to log files.

FIG. 13 and FIG. 14 are diagrams related to log files. There can be two pipelines embedded into the same architecture. To give an overall view, the logger can create log files with timestamp to milliseconds, so that querying the log files may be easier. Nested folders for day and hour can be created to better classify the files. The log files can be stored in cloud storage on a one way sync (e.g., Google File Stream). A branch of the pipeline can decode the NMEA network into JSON files and uploads into the local platforms database server (or other similar platforms or database programs) real time for the captain.

Log file name syntax: yyyy-MM-dd'T'HH:mm:ss.SSSZZZZ

Example: "my_log_1_2018-10-02T23:59:59.573+02:00"

In an instance, the pipeline includes extracting NMEA data from a compass and redirecting it to Python to store it in a buffer. A subprocess is a library in Python that lets one run terminal commands, redirect the console output to a buffer in memory, and return a Python generator for that pointer. A generator lets one iterate over the console output once saving memory after iterating over an element. The NMEA logs are generated line by line and are stored in the buffer one per line. Since the logs can be generated infinitely, the program may run forever. The buffer variable may be known or available, so readline can be used to read once per line.

Once the line is read, a log file is created and the line is saved in a log file. Information can continue to be saved in a single file for up to, for example, one minute. After the minute is up, the file can be changed using the new time-stamp and buffering can start into the new one. After an hour is up, folders are changed and new files are created there. After a day is up, a new folder above the current folders is created. The period to save to a single file or folder can vary, and the description herein is merely exemplary. The data may then be uploaded to cloud storage or another cloud storage service.

For an offline pipeline branch, NMEA data may be automatically saved into a dummy.log file whenever one line of NMEA data is obtained. A decoder may be run on the file. This can generate a JSON file with just one dictionary of data. This can be read back and timestamped. The file may be formatted and uploaded to the platform database or another location. This generates compass logs into the offline platform database (or other similar platforms or database programs). This process may take approximate one millisecond. This may be an acceptable time period because the compass does not generally generate data so fast that the buffer will fill up before one millisecond is up.

In another embodiment, one line of log is not saved to a file every time. Instead, the line of log is sent back into the Python buffer and saved in the platform database or another location. This can reduce the time by half, but may require a particular decoder configuration. The decoder may be a C++ application that runs in the command prompt.

The code for these logs may be completely modular and run by functions. The code also may be reusable. The same code was used to classify RADAR data into Pcap files and upload it to cloud storage.

The same code is used to classify the RADAR logs and timestamp it. This code was modified to change the terminal command to get the RADAR logs from the Ethernet network. To do this a command that captures network data is used. An application, for example, a Java application, was developed that uses these RADAR files to create a view of the RADAR on an application. The RADAR logs are bigger than log files. Thus, the files were compressed. Gzip compression was used as a compression algorithm in one instance, but other compression algorithms can be used. Compression reduces the size of the Pcap files to be, for example, 10% the size of the original file in an efficient manner. Files may be compressed before uploading to cloud storage.

Training data may be inputted to model training (e.g., CNN training), which may be performed in any suitable manner. For example, the model training may include inputting the training data to the deep learning model (e.g., a CNN) and modifying one or more parameters of the model until the output of the model is the same as (or substantially the same as) the labels assigned to the data. Model training may generate one or more trained models, which may then be sent to model selection, which is performed using validation data. The results that are produced by each one or more trained models for the validation data that is input to the one or more trained models may be compared to the labels assigned to the validation data to determine which of the models is the best model. For example, the model that produces results that most closely match the validation data labels may be selected as the best model. Test data may then be used for model evaluation of the model that is selected (e.g., the best model). Model evaluation may be performed in any suitable manner. For example, the test data may be input to the best model and the results produced by the best model for the test data may be compared to the labels for the test data to determine how closely the results produced by the best model match the labels. Best model may also be sent, to model deployment in which the best model may be sent to the maritime vessel for use (post-training mode). The best model may then be applied to additional images, data, output, etc. generated by or provided to the maritime vessel.

In an embodiment, reinforcement learning of the CNN is tuned. Thus, the CNN can learn settings on different objects and perform the same action. With respect to ships or boats, the CNN may need to learn each individual object because each of the ships or boats is unique and has unique performances. Reinforcement learning can be used to tune the actuators like thrusters, propellers, rudder, etc. The sensitivity of these components can change from ship to ship. For the CNN to detect objects, the existing network can be retained with the new batch of images.

The CNN can be trained with images that show a ship or boat that changes over time. Barnacles, wear-and-tear, and changes in fuel type can all affect operation or performance of a ship or boat. A synthetic data generator can be used to accommodate changes to the ship or boat over time. These changes also can be accommodated by modifying existing images in a library to show various changes as disclosed with respect to FIG. 18.

The vessel may identify and classify objects using deep learning techniques, such as one or more CNNs. Tensor-Flow's Inception network provides such a CNN. The configuration of a CNN may change based on the sensor information that is provided or the type of maritime vessel.

Deep learning (also known as deep structured learning, hierarchical learning or deep machine learning) is a branch of machine learning based on a set of algorithms that attempt to model high-level abstractions in data. In a simple case, there may be two sets of neurons: ones that receive an input signal and ones that send an output signal. When the input layer receives an input, it passes on a modified version of the input to the next layer. In a deep network, there are many layers between the input and output, allowing the algorithm to use multiple processing layers, composed of multiple linear and non-linear transformations.

Deep learning is part of a broader family of machine learning methods based on learning representations of data. An observation (e.g., an image) can be represented in many ways such as a vector of intensity values per pixel, or in a more abstract way as a set of edges, regions of particular shape, etc. Some representations are better than others at simplifying the learning task (e.g., face recognition or facial expression recognition). Deep learning can provide efficient algorithms for unsupervised or semi-supervised feature learning and hierarchical feature extraction.

Research in this area attempts to make better representations and create models to learn these representations from large-scale unlabeled data. Some of the representations are inspired by advances in neuroscience and are loosely based on interpretation of information processing and communication patterns in a nervous system, such as neural coding which attempts to define a relationship between various stimuli and associated neuronal responses in the brain.

There are many variants of neural networks with deep architecture depending on the probability specification and network architecture, including, but not limited to, Deep Belief Networks (DBN), Restricted Boltzmann Machines (RBM), and Auto-Encoders. Another type of deep neural network, a CNN, can be used for image classification. Although other deep learning neural networks can be used, an exemplary embodiment of the present disclosure is described using a TensorFlow architecture to illustrate the concepts of a CNN. The actual implementation may vary depending on the size of images, the number of images available, and the nature of the problem. Other layers may be included in the object detection network besides the neural networks disclosed herein.

In an example, the neural network framework may be TensorFlow 1.0. The algorithm may be written in Python.

In an embodiment, the deep learning model is a machine learning model. Machine learning can be generally defined as a type of artificial intelligence (AI) that provides computers with the ability to learn without being explicitly programmed. Machine learning focuses on the development of computer programs that can teach themselves to grow and change when exposed to new data. Machine learning explores the study and construction of algorithms that can learn from and make predictions on data. Such algorithms overcome following strictly static program instructions by making data driven predictions or decisions, through building a model from sample inputs.

In some embodiments, the deep learning model is a generative model. A generative model can be generally defined as a model that is probabilistic in nature. In other words, a generative model is one that performs forward simulation or rule-based approaches. The generative model can be learned (in that its parameters can be learned) based on a suitable training set of data. In one embodiment, the deep learning model is configured as a deep generative model. For example, the model may be configured to have a deep learning architecture in that the model may include multiple layers, which perform a number of algorithms or transformations.

In another embodiment, the deep learning model is configured as a neural network. In a further embodiment, the deep learning model may be a deep neural network with a set of weights that model the world according to the data that it has been fed to train it. Neural networks can be generally defined as a computational approach, which is based on a relatively large collection of neural units loosely modeling the way a biological brain solves problems with relatively large clusters of biological neurons connected by axons. Each neural unit is connected with many others, and links can be enforcing or inhibitory in their effect on the activation state of connected neural units. These systems are self-learning and trained rather than explicitly programmed and excel in areas where the solution or feature detection is difficult to express in a traditional computer program.

Neural networks typically consist of multiple layers, and the signal path traverses from front to back. The goal of the neural network is to solve problems in the same way that the human brain would, although several neural networks are much more abstract. Modern neural network projects typically work with a few thousand to a few million neural units and millions of connections. The neural network may have any suitable architecture and/or configuration known in the art.

In one embodiment, the deep learning model used for the maritime applications disclosed herein is configured as an AlexNet. For example, an AlexNet includes a number of convolutional layers (e.g., 5) followed by a number of fully connected layers (e.g., 3) that are, in combination, configured and trained to classify images. In another such embodiment, the deep learning model used for the maritime applications disclosed herein is configured as a GoogleNet. For example, a GoogleNet may include layers such as convolutional, pooling, and fully connected layers such as those described further herein configured and trained to classify images. While the GoogleNet architecture may include a relatively high number of layers (especially compared to some other neural networks described herein), some of the layers may be operating in parallel, and groups of layers that function in parallel with each other are generally referred to as inception modules. Other of the layers may operate sequentially. Therefore, GoogleNets are different from other neural networks described herein in that not all of the layers are arranged in a sequential structure. The parallel layers may be similar to Google's Inception Network or other structures.

In a further such embodiment, the deep learning model used for the maritime applications disclosed herein is configured as a Visual Geometry Group (VGG) network. For example, VGG networks were created by increasing the number of convolutional layers while fixing other parameters of the architecture. Adding convolutional layers to increase depth is made possible by using substantially small convolutional filters in all of the layers. Like the other neural networks described herein, VGG networks were created and trained to classify images. VGG networks also include convolutional layers followed by fully connected layers.

In some such embodiments, the deep learning model used for the maritime applications disclosed herein is configured as a deep residual network. For example, like some other networks described herein, a deep residual network may include convolutional layers followed by fully-connected layers, which are, in combination, configured and trained for image classification. In a deep residual network, the layers are configured to learn residual functions with reference to the layer inputs, instead of learning unreferenced functions. In particular, instead of hoping each few stacked layers directly fit a desired underlying mapping, these layers are explicitly allowed to fit a residual mapping, which is realized by feedforward neural networks with shortcut connections. Shortcut connections are connections that skip one or more layers. A deep residual net may be created by taking a plain neural network structure that includes convolutional layers and inserting shortcut connections, which thereby takes the plain neural network and turns it into its residual learning counterpart.

In a further such embodiment, the deep learning model used for the maritime applications disclosed herein includes one or more fully connected layers configured for classifying defects on the specimen. A fully connected layer may be generally defined as a layer in which each of the nodes is connected to each of the nodes in the previous layer. The fully connected layer(s) may perform classification based on the features extracted by convolutional layer(s), which may be configured as described further herein. The fully connected layer(s are configured for feature selection and classification. In other words, the fully connected layer(s) select features from a feature map and then classify the objects in the image(s) based on the selected features. The selected features may include all of the features in the feature map (if appropriate) or only some of the features in the feature map.

If the deep learning model outputs a classification for an object detected in the image, the deep learning model may output an image classification, which may include a classification result per image with a confidence associated with each classification result. The results of the image classification can also be used as described further herein. The image classification may have any suitable format (such as an image or object ID, an object description such as "iceberg," etc.). The image classification results may be stored and used as described further herein.

In some embodiments, the information determined by the deep learning model includes features of the images extracted by the deep learning model. In one such embodiment, the deep learning model includes one or more convolutional layers. The convolutional layer(s) may have any suitable configuration known in the art and are generally configured to determine features for an image as a function of position across the image (i.e., a feature map) by applying a convolution function to the input image using one or more filters. In this manner, the deep learning model (or at least a part of the deep learning model) may be configured as a CNN. For example, the deep learning model may be configured as a CNN, which is usually stacks of convolution and pooling layers, to extract local features. The embodiments described herein can take advantage of deep learning concepts such as a CNN to solve the normally intractable representation inversion problem. The deep learning model may have any CNN configuration or architecture known in the art. The one or more pooling layers may also have any suitable configuration known in the art (e.g., max pooling layers) and are generally configured for reducing the dimensionality of the feature map generated by the one or more convolutional layers while retaining the most important features.

The features determined the deep learning model may include any suitable features described further herein or known in the art that can be inferred from the input described herein (and possibly used to generate the output described further herein). For example, the features may include a vector of intensity values per pixel. The features may also include any other types of features described herein, e.g., vectors of scalar values, vectors of independent distributions, joint distributions, or any other suitable feature types known in the art.

In general, the deep learning model described herein is a trained deep learning model. For example, the deep learning model may be previously trained by one or more other systems and/or methods. The deep learning model is already generated and trained and then the functionality of the model is determined as described herein, which can then be used to perform one or more additional functions for the deep learning model.

In an exemplary embodiment, the features are extracted from images using a CNN. The CNN has one or more convolutional layers, and each convolutional layer is usually followed by a subsampling layer. Convolutional networks are inspired by visual systems structure. The visual cortex contains a complex arrangement of cells. These cells are sensitive to small sub-regions of the visual field, called a receptive field. A small region in the input is processed by a neuron in the next layer. Those small regions are tiled up to cover the entire input images.

Each node in a convolutional layer of the hierarchical probabilistic graph can take a linear combination of the inputs from nodes in the previous layer, and then applies a nonlinearity to generate an output and pass it to nodes in the next layer. To emulate the mechanism of the visual cortex, CNNs first convolve the input image with a small filter to generate feature maps (each pixel on the feature map is a neuron corresponds to a receptive field). Each map unit of a feature map is generated using the same filter. In some embodiments, multiple filters may be used and a corresponding number of feature maps will result. A subsampling layer computes the max or average over small windows in the previous layer to reduce the size of the feature map, and to obtain a small amount of shift invariance. The alternate between convolution and subsampling can be repeated multiple times. The final layer is fully connected traditional neural network. From bottom to top, the input pixel value was abstracted to local edge pattern to object part to final object concept.

As stated above, although a CNN is used herein to illustrate the architecture of an exemplary deep learning system, the present disclosure is not limited to a CNN. Other variants of deep architectures may be used in embodiments; for example, Auto-Encoders, DBNs, and RBMs, can be used to discover useful features from unlabeled images.

CNNs may comprise of multiple layers of receptive fields. These are small neuron collections, which process portions of the input image or images. The outputs of these collections are then tiled so that their input regions overlap, to obtain a better representation of the original image. This may be repeated for every such layer. Tiling allows CNNs to tolerate translation of the input image. CNN may have 3D volumes of neurons. The layers of a CNN may have neurons arranged in three dimensions: width, height and depth. The neurons inside a layer are only connected to a small region of the layer before it, called a receptive field. Distinct types of layers, both locally and completely connected, are stacked to form a CNN architecture. CNNs exploit spatially local correlation by enforcing a local connectivity pattern between neurons of adjacent layers. The architecture thus ensures that the learnt filters produce the strongest response to a spatially local input pattern. Stacking many such layers leads to non-linear filters that become increasingly global (i.e., responsive to a larger region of pixel space). This allows the network to first create good representations of small parts of the input, and then assemble representations of larger areas from them. In CNNs, each filter is replicated across the entire visual field. These replicated units share the same parameterization (weight vector and bias) and form a feature map. This means that all the neurons in a given convolutional layer detect exactly the same feature. Replicating units in this way allows features to be detected regardless of their position in the visual field, thus constituting the property of translation invariance.

Together, these properties allow CNNs achieve better generalization on vision problems. Weight sharing also helps by dramatically reducing the number of free parameters being learnt, thus lowering the memory requirements for running the network. Decreasing the memory footprint allows the training of larger, more powerful networks. CNNs may include local or global pooling layers, which combine the outputs of neuron clusters. Pooling layers may also consist of various combinations of convolutional and fully connected layers, with pointwise nonlinearity applied at the end of or after each layer. A convolution operation on small regions of input is introduced to reduce the number of free parameters and improve generalization. One advantage of CNNs is the use of shared weight in convolutional layers, which means that the same filter (weights bank) is used for each pixel in the layer. This also reduces memory footprint and improves performance.

A CNN architecture may be formed by a stack of distinct layers that transform the input volume into an output volume (e.g., holding class scores) through a differentiable function. A few distinct types of layers may be used. The convolutional layer has a variety of parameters that consist of a set of learnable filters (or kernels), which have a small receptive field, but extend through the full depth of the input volume. During the forward pass, each filter may be convolved across the width and height of the input volume, computing the dot product between the entries of the filter and the input and producing a two-dimensional activation map of that filter. As a result, the network learns filters that activate when they see some specific type of feature at some spatial position in the input. By stacking the activation maps for all filters along the depth dimension, a full output volume of the convolution layer is formed. Every entry in the output volume can thus also be interpreted as an output of a neuron that looks at a small region in the input and shares parameters with neurons in the same activation map.

When dealing with high-dimensional inputs such as images, it may be impractical to connect neurons to all neurons in the previous volume because such a network architecture does not take the spatial structure of the data into account. CNNs may exploit spatially local correlation by enforcing a local connectivity pattern between neurons of adjacent layers. For example, each neuron is connected to only a small region of the input volume. The extent of this connectivity is a hyperparameter called the receptive field of the neuron. The connections may be local in space (along width and height), but always extend along the entire depth of the input volume. Such an architecture ensures that the learnt filters produce the strongest response to a spatially local input pattern. In one embodiment, training the CNN includes using transfer learning to create hyperparameters for each CNN. Transfer learning may include training a CNN on a very large dataset and then use the trained CNN weights as either an initialization or a fixed feature extractor for the task of interest.

Three hyperparameters can control the size of the output volume of the convolutional layer: the depth, stride and zero-padding. Depth of the output volume controls the number of neurons in the layer that connect to the same region of the input volume. All of these neurons will learn to activate for different features in the input. For example, if the first CNN layer takes the raw image as input, then different neurons along the depth dimension may activate in the presence of various oriented edges, or blobs of color. Stride controls how depth columns around the spatial dimensions (width and height) are allocated. When the stride is 1, a new depth column of neurons is allocated to spatial positions only 1 spatial unit apart. This leads to heavily overlapping receptive fields between the columns, and to large output volumes. Conversely, if higher strides are used then the receptive fields will overlap less and the resulting output volume will have smaller dimensions spatially. Sometimes it is convenient to pad the input with zeros on the border of the input volume. The size of this zero-padding is a third hyperparameter. Zero padding provides control of the output volume spatial size. In particular, sometimes it is desirable to preserve exactly the spatial size of the input volume.

In some embodiments, a parameter-sharing scheme may be used in layers to control the number of free parameters. If one patch feature is useful to compute at some spatial position, then it may also be useful to compute at a different position. In other words, denoting a single 2-dimensional slice of depth as a depth slice, neurons in each depth slice may be constrained to use the same weights and bias.

Since all neurons in a single depth slice may share the same parametrization, then the forward pass in each depth slice of the layer can be computed as a convolution of the neuron's weights with the input volume. Therefore, it is common to refer to the sets of weights as a filter (or a kernel), which is convolved with the input. The result of this convolution is an activation map, and the set of activation maps for each different filter are stacked together along the depth dimension to produce the output volume.

Sometimes, parameter sharing may not be effective, for example, when the input images to a CNN have some specific centered structure, in which completely different features are expected to be learned on different spatial locations.

Another important concept of CNNs is pooling, which is a form of non-linear down-sampling. There are several non-linear functions to implement pooling among which max pooling is one. Max pooling partitions the input image into a set of non-overlapping rectangles and, for each such sub-region, outputs the maximum. Once a feature has been found, its exact location may not be as important as its rough location relative to other features. The function of the pooling layer may be to progressively reduce the spatial size of the representation to reduce the amount of parameters and computation in the network, and hence to also control overfitting. A pooling layer may be positioned in-between successive cony layers in a CNN architecture.

Another layer in a CNN may be a ReLU (Rectified Linear Units) layer. This is a layer of neurons that applies a non-saturating activation function. A ReLU layer may increase the nonlinear properties of the decision function and of the overall network without affecting the receptive fields of the convolution layer.

Finally, after several convolutional and/or max pooling layers, the high-level reasoning in the neural network is completed via fully connected layers. Neurons in a fully connected layer have full connections to all activations in the previous layer. Their activations can hence be computed with a matrix multiplication followed by a bias offset.

In some embodiments, dropout techniques may be utilized to prevent overfitting. As referred to herein, dropout techniques are a regularization technique for reducing overfitting in neural networks by preventing complex co-adaptations on training data. The term "dropout" refers to dropping out units (both hidden and visible) in a neural network. For example, at each training stage, individual nodes may be either "dropped out" of the CNN with probability 1-p or kept with probability p, so that a reduced CNN remains. In some embodiments, incoming and outgoing edges to a dropped-out node may also be removed. Only the reduced CNN is trained. Removed nodes may then be reinserted into the network with their original weights.

In training stages, the probability a hidden node will be retained (i.e., not dropped) may be approximately 0.5. For input nodes, the retention probability may be higher. By avoiding training all nodes on all training data, dropout decreases overfitting in CNNs and significantly improves the speed of training.

Many different types of CNNs may be used in embodiments of the present disclosure. Different CNNs may be used based on certain information inputs, applications, or other circumstances.

Figure 26:
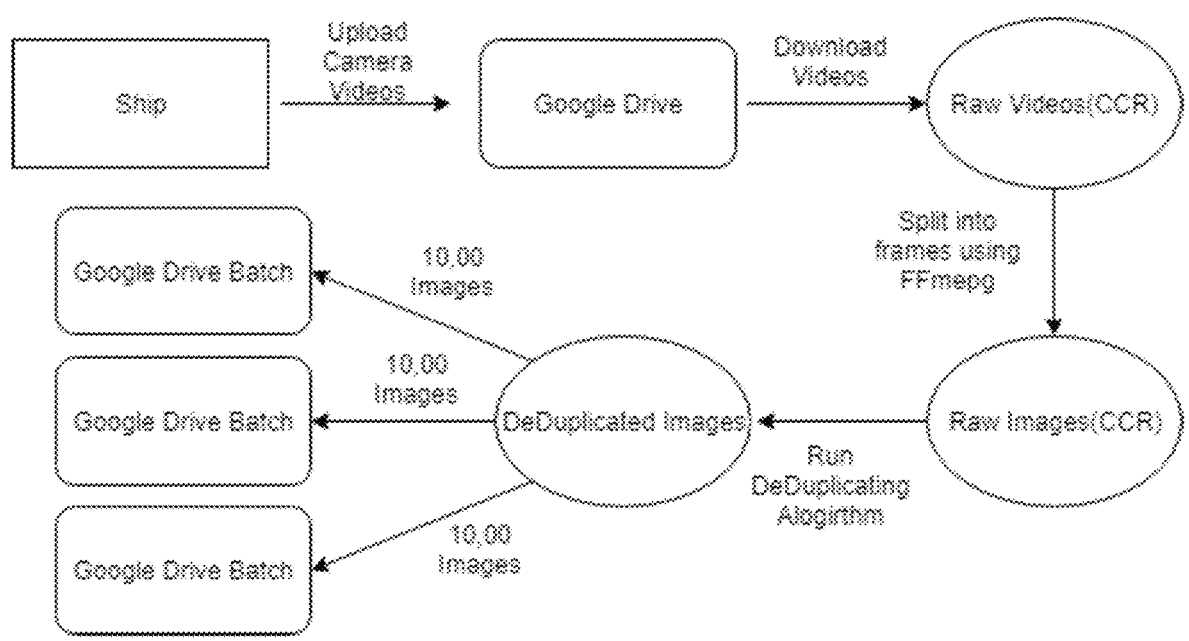
FIG. 26 is a flowchart of a deduplication embodiment in accordance with the present disclosure.

FIG. 26 is a flowchart of a deduplication embodiment. Steps are taken to prepare images for annotation. These images can then be used for training a neural network in the objection detection network. Videos from one or more ships are uploaded onto Google Drive. These videos are then parallel downloaded into CCR temporary memory. Using ffmpeg these frames are parsed into jpgs (1 every 15 seconds of video), which are saved in a separate folder in the CCR temporary memory.

To eliminate annotating two similar images, which would be a waste of manpower, an algorithm is used to analyze the likeness of two images and to delete one of the images if they are at least 75% similar. Only images within the same half hour are checked against each other to increase efficiency.

After an image is found to have no duplicates, it is saved in a folder in the temporary memory in CCR. At the end of the process the images in this folder are uploaded to Google Drive in batches of 10,000.

Hash outputs can be used for images. Hash outputs within a threshold can be considered the same image or same object. A hashing function based on different features in an image like pixel colors, gradient, hue, saturation, corners, or other features can be used.

Figure 27:
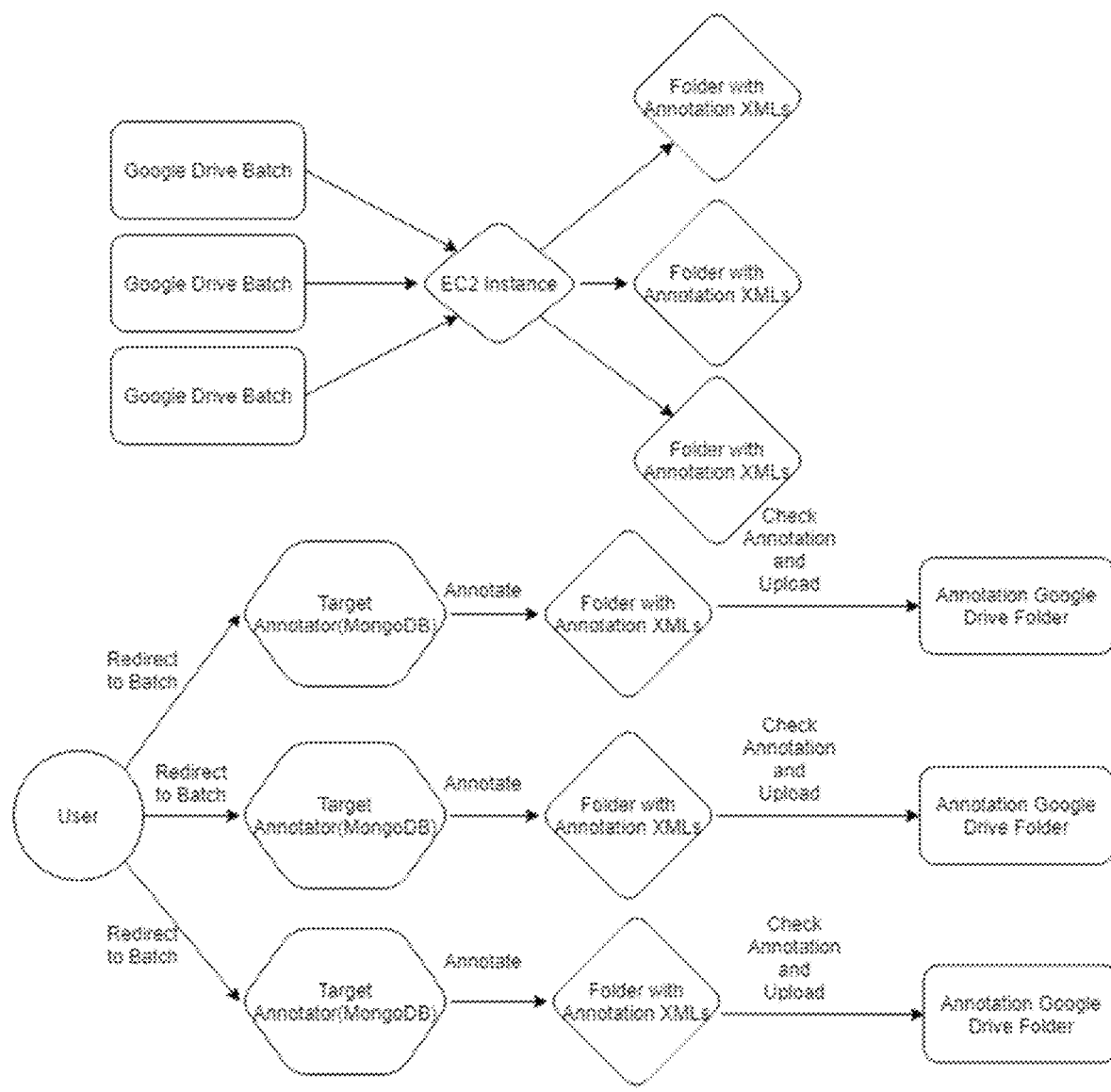
FIG. 27 is a flowchart of an embodiment of image annotation in accordance with the present disclosure.

FIG. 27 is a flowchart of an embodiment of image annotation. The deduplicated images are downloaded from Google Drive onto an Amazon EC2 instance. After every batch in the folder is downloaded, a Script is run to create an empty XML for each image that will later receive the annotation. Once a batch is successfully downloaded and prepared, the link to the batch is added to the redirect section of the target annotator in MongoDB or other similar platforms or database programs. As well, a script is run to find the first image in the batch, and the name of the first image is put at the end of the redirect link.

Once the annotator indicates that they have finished a batch, a script is run to check the number of each category the annotator has boxed. If the classification numbers are reasonable, the annotation XMLs are uploaded to Google Drive.

The IPs of the cameras are passed into the Script using a CSV. For every IP in the CSV, a new thread is created, which has four subthreads. One subthread reads frames for the live http stream using OpenCV (the rtsp stream was found to have up to 3 seconds of lag) and puts each frame into a multiprocessing Queue object. Then, the two worker threads run object detection on the frames in the input Queue and put the frames with boundary boxes into the output Queue (also a multiprocessing Queue object). The number of worker threads can be changed to maximize speed depending on the system. The first thread also pulls images from the output Queue and puts them into an input stream Queue. The fourth thread starts a flask server instance and runs it using the input stream Queue to stream a video to the local network.

In an example, the penultimate layer of TensorFlow's Inception (neural-network) is retrained with images of plain sea, boat, ships, and icebergs. Image recognition is performed on the new network to validate the accuracy using testing images, in an offline environment.

In an example, three training datasets are used. First, a temporary dataset (TDS) that includes images collected by crawling the web. Second, the KITTI 2012, KITTI 2015, and Middlebury stereo datasets for training and evaluation of the CNN for distance estimation from stereoscopic images task.

The KITTI stereo data set is a collection of rectified image pairs taken from two video cameras mounted on the roof of a car, roughly 54 centimeters apart. The images were recorded while driving in and around the city of Karlsruhe, in sunny and cloudy weather, at daytime. The images were taken at a resolution of 1240×376. A rotating laser scanner mounted behind the left camera recorded ground truth depth, labeling around 30% of the image pixels. Two KITTI stereo data sets exist: KITTI 2012 and, the newer, KITTI 2015. For the task of computing stereo, they are nearly identical, with the newer data set improving some aspects of the optical flow task. The 2012 data set contains 194 training and 195 testing images, while the 2015 data set contains 200 training and 200 testing images. There is a subtle but important difference introduced in the newer data set: vehicles in motion are densely labeled and car glass is included in the evaluation. This emphasizes the method's performance on reflective surfaces.

The image pairs of the Middlebury stereo data set are indoor scenes taken under controlled lighting conditions. Structured light was used to measure the true disparities with higher density and precision than in the KITTI dataset. The data sets were published in five separate works in the years 2001, 2003, 2005, 2006, and 2014.

While the KITTI and Middlebury data sets did not include maritime objects, these data sets were still used for training. The neural networks of stereo depth estimation are not data dependent as they do not detect objects. Thus, the neural network needs to see objects at a similar distance in the maritime implementation. The neural network may perform better if it is trained on a maritime dataset because the distance-image mapping learned from the car data set is lesser than the one it would try to predict in the maritime space. Maritime data can be gathered to create a data set and potentially re-train the neural network.

In an instance, the ship classifier uses Inception-v3 (open source) and trains the penultimate layer. Inception-v3 is a pre-trained deep learning model. It was developed by Google and has been trained for the ImageNet Competition using the data from 2012. This model has high classification performance and is available in TensorFlow.

The penultimate layer of the Inception-v3 is retrieved as a feature vector for each image. The last layer of the CNN corresponds to the classification step. As it has been trained for the ImageNet dataset, the categories that it will be outputted may not correspond to the categories in the Product Image Classification dataset for maritime applications. The output of the next-to-last layer, however, corresponds to features that are used for the classification in Inception-v3. These features can be useful for training another classification model, so the output of this layer is extracted.

This approach is referred to as transfer learning, and can take a pre-trained model and use it to extract image features that are then used to train a new classifier.

During preprocessing, a set of labeled images in a cloud storage bucket are preprocessed to extract the image features from the penultimate layer of the Inception network. Each image can be processed independently and in parallel using cloud dataflow. Each image is processed to produce its feature representation in the form of a k-dimensional vector of floats (e.g., 2,048 dimensions). The preprocessing can include converting the image format, resizing images, and/or running the converted image through a pre-trained model to get the embeddings. Finally, the output may be written back to cloud storage so that it can be reused for training.

Figure 15:
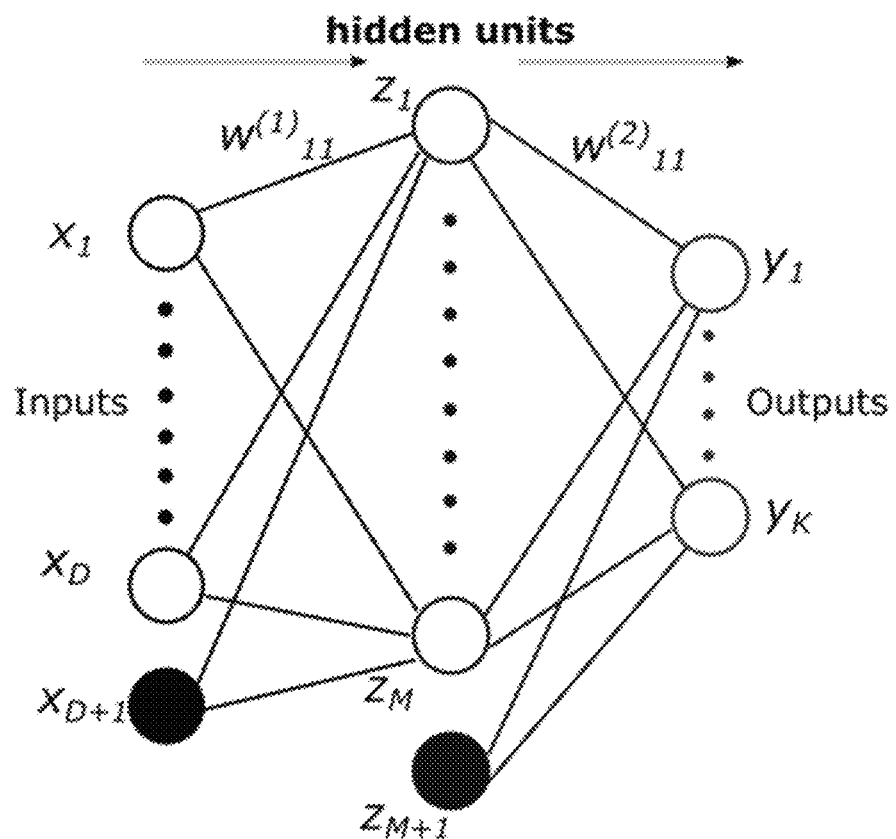
FIG. 15 illustrates a neural network for ship classifier type 2 (SCT2)
Figure 16:
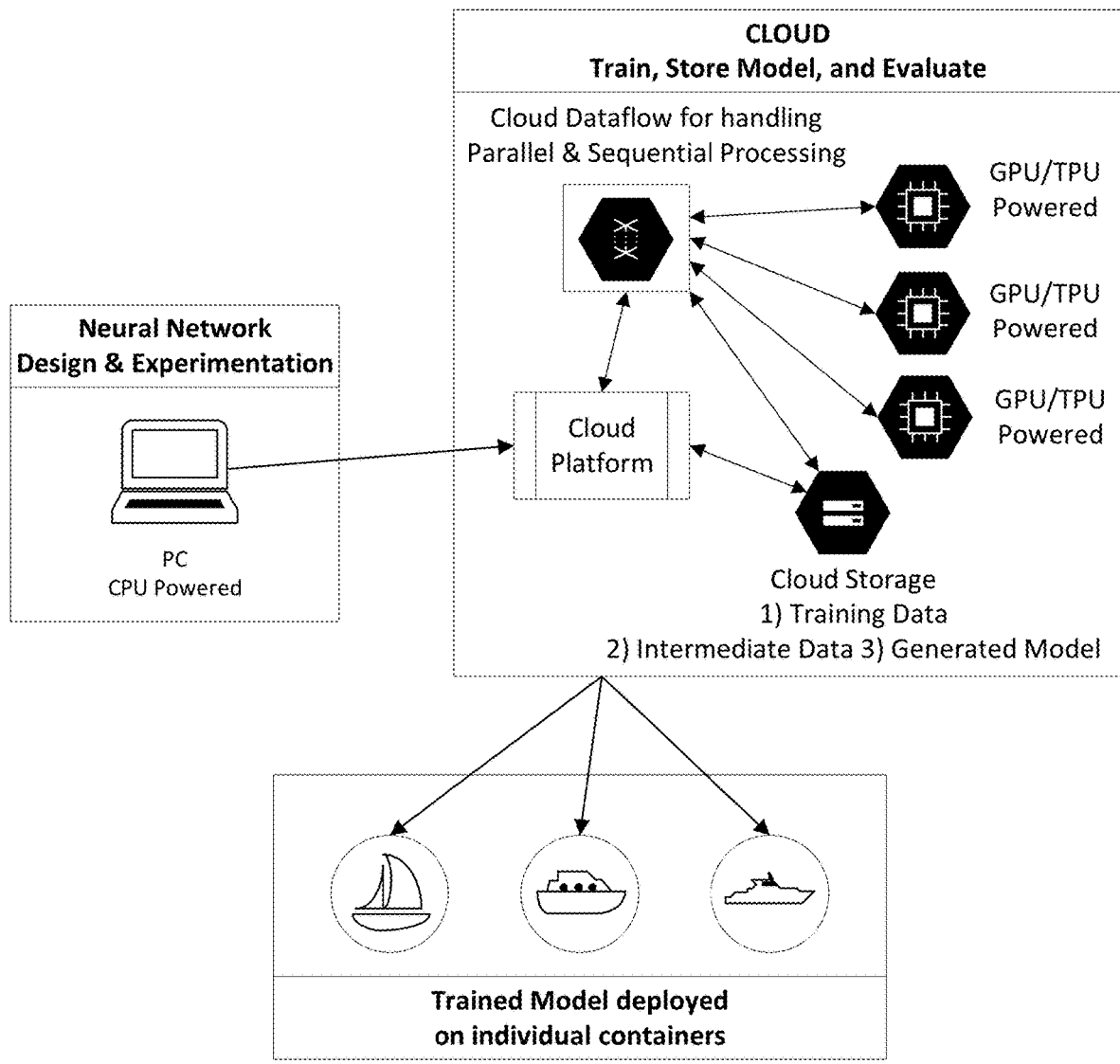
FIG. 16 is a diagram showing an individual neural network's lifecycle.
Figure 17:
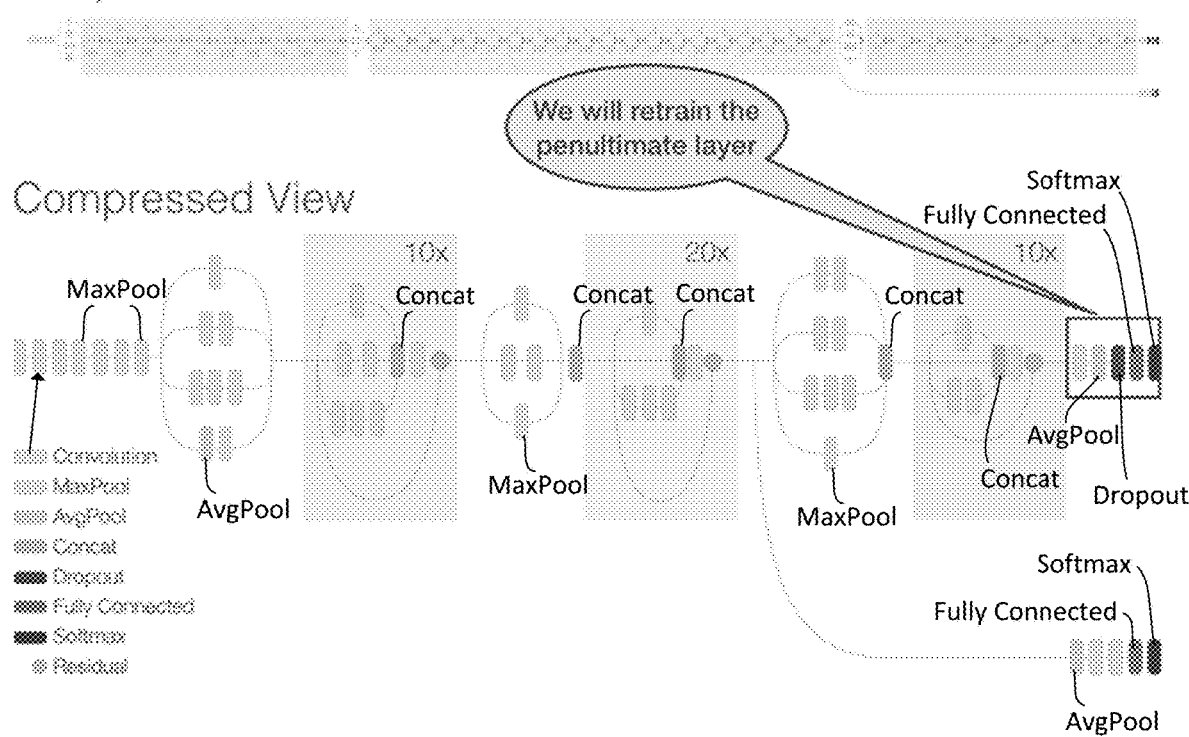
FIG. 17 is a diagram showing a training network, exemplified in an inception Resnet V2 network.

A neural network can be graphically represented as in FIG. 15. FIG. 16 is a diagram showing an individual neural network's lifecycle and FIG. 17 is a diagram showing the inception Resnet V2 network. As observed in the FIG. 15, there are totally three layers in the neural network. The first layer includes (d+1) units; each represents a feature of image. There is one extra unit representing the bias.

Note, it is not necessary to use Inception V2 and this is merely used as an example. The best-in-class current network can be used and the last few layers can be retrained for marine purposes.

The second layer in neural network is referred to as hidden units. Herein, m+1 denotes the number of hidden units in hidden layer. There also can be an additional bias node at the hidden layer. Hidden units can be considered as the learned features extracted from the original data set. Since a number of hidden units can represent the dimension of learned features in neural network, an appropriate number of hidden units can be selected by a user. Too many hidden units may lead to the slow training phase while too few hidden units may cause an under-fitting problem.

The third layer is referred to as the output layer. The value of lth unit in the output layer represents the probability of a certain image belongs to the category "l." Since twelve possible label categories are present, there are twelve units in the output layer.

The reference "k" denotes the number of output units in output layer (k=12). The parameters in neural network model are the weights associated with the hidden layer units and the output layers units. In a neural network with three layers (input, hidden, output), two matrices may be used to represent the model parameters.

$W(1) \in Rm \times (d+1)$ is the weight matrix of connections from input layer to hidden layer. Each row in this matrix corresponds to the weight vector at each hidden layer unit.

$W(2) \in Rk \times (m+1)$ is the weight matrix of connections from hidden layer to output layer. Each row in this matrix corresponds to the weight vector at each output layer unit. It can be assumed that there are n training samples when performing learning task of neural network.

The number of hidden layers will likely be more than three in a neural network that is designed for maritime applications. The activation function used here is sigmoid, but other activation functions are possible.

Regularization can be performed to avoid an overfitting problem. The learning model can be best fit with the training data, but may give poor generalization when tested with validation data. A regularization term can be added into an error function to control the magnitude of parameters in neural network. The objective function can be written as follows.

$$J(W^{(1)}, W^{(2)}) = J(W^{(1)}, W^{(2)}) + \frac{\lambda}{2n}\left(\sum_{j=1}^{m}\sum_{p=1}^{d+1}(w_{jp}^{(1)})^2 + \sum_{l=1}^{k}\sum_{j=1}^{m+1}(w_{lj}^{(2)})^2\right)$$

In these equations, d is the number of pixels in an image, m+1 is the number of hidden units, l is the probability of the output category, k is the number of output units in the output layer, W(1) are the weights attached to the first layer of the neural network, W(2) are the weights attached to the second layer of the neural network, J is the loss function, and λ is the regularization coefficient (e.g., hyper parameter).

Other appropriate variations of neural networks may be used to detect objects and classify them in accordance with the present disclosure.

Embodiments disclosed herein also can provide a rare ship category, crawl the data, and synthesize data to different water environments. While disclosed with respect to ships, the techniques can be applied to other vehicles such as land or air vehicles. The techniques also can be applied to other objects such as manufacturing defects (e.g., microcracks or other microscopic defects), faces, medical diagnostic information (e.g., tumors), or other objects that are commonly identified by artificial intelligence.

Figure 18:
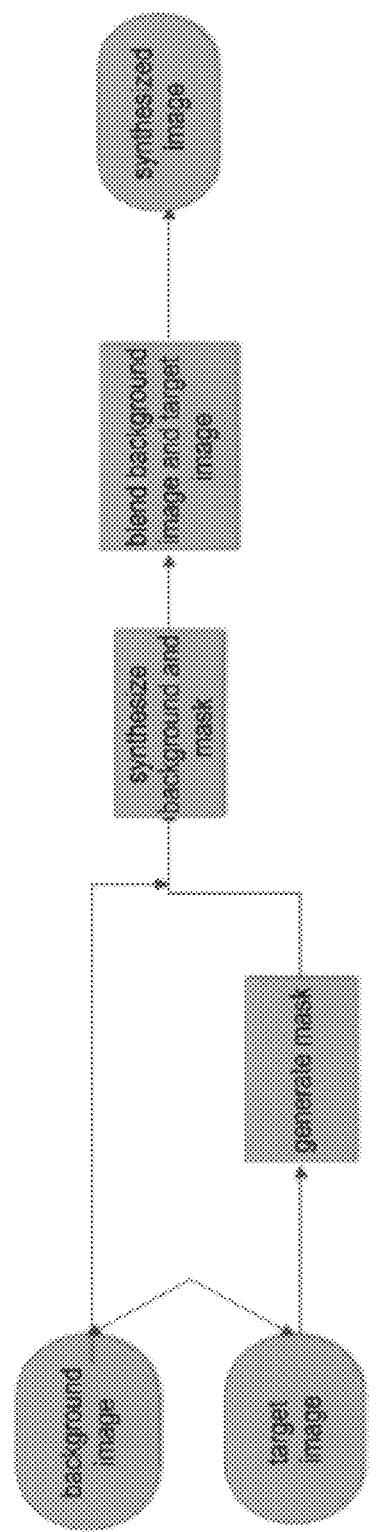
FIG. 18 is a flowchart of an embodiment in accordance with the present disclosure.

FIG. 18 is a flowchart of an embodiment. A mask of the target image (e.g., image of a maritime object or other object) can be determined. The background image and the mask can be synthesized or otherwise determined. The background image and the target image can then be blended to form a second image (e.g., a synthesized image). The second image can have different water conditions, sky conditions, and/or light conditions when compared to the target image, but may still include the maritime object in the target image.

The mask before blending may be a binary mask. The target to be put on the background image may be white or black.

Figure 19:
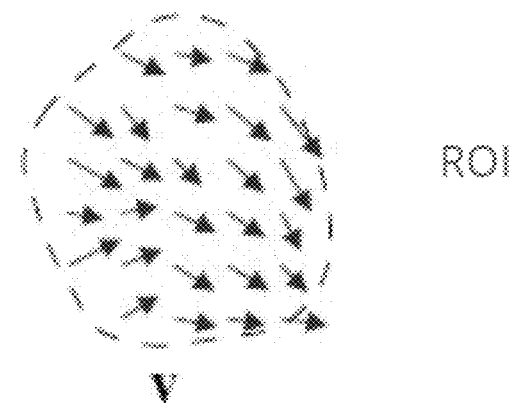
FIG. 19 illustrates an exemplary gradient field of an image.

An example is provided. In a first step, the gradient field of an image (e.g., an image of a maritime object) g can be determined. By a differential method, the gradient field v of the image g can be determined. Thus, the gradient field V (pathchGradientC, patchGradientY) of g can be determined. An exemplary gradient field V is shown in FIG. 19.

Figure 20:
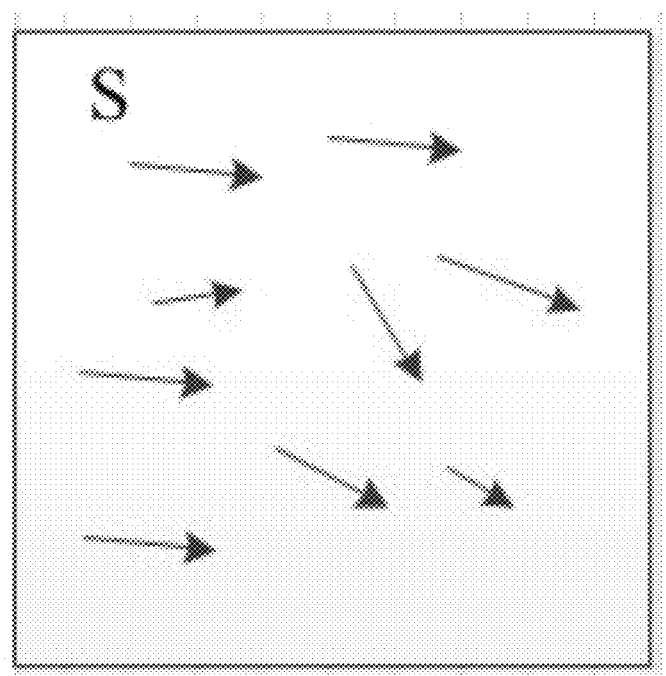
FIG. 20 illustrates an exemplary gradient field of a background image.

In a second step, the gradient field of a background image is determined. FIG. 20 illustrates an exemplary gradient field of a background image.

The variable destination is the background image. In this way, the gradient field (destinationGradientC, destinationGradientY) of the background image is obtained as shown in FIG. 20.

Figures 21, 22:
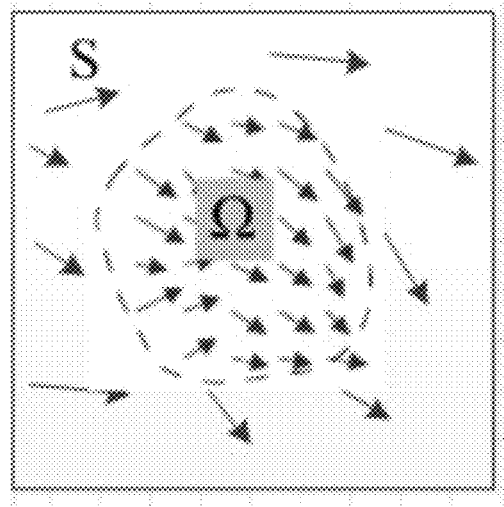
FIG. 21 illustrates a gradient field of a fused image.
FIG. 22 is an exemplary coefficient matrix.

In a third step, the gradient field of the second (fused) image is determined. The fused image is the combination of the image and the background image. After the calculation is finished, the gradient field of the ROI is covered to the gradient field of S. A mask is obtained. In an instance, $\Omega$ area's value is 0 and the other area's value is 1. This can be seen in FIG. 21.

In a fourth step, the divergence of the fused image can be solved. Using the third step, the gradient value of each pixel can be obtained. Thus, the gradient field of the image to be reconstructed can be obtained. The gradient may need to be guided to obtain the divergence.

If the fused image has more divergence, then it can help better train a model for an artificial intelligence module.

In a fifth step, the coefficient matrix is solved. The elements of the diagonal of the matrix A are −4, and then there are four other non-zero elements corresponding to each row. Its value is 1 in this instance because a Laplacian convolution kernel is used. There also is a point that the value of the image boundary pixels should be 1. So for the matrix of FIG. 22, in addition to the boundary pixels, the boundary pixels of the above 3*3 image are 1, 2, 3, 4, 5, 6, 7, 8 and 9. The divergence of other pixels may be known, so the Poisson equation can be generated.

$$[V(2)+V(4)+V(6)+V(8)]-4*V(5)=\text{div}(5)$$

As seen in FIG. 23, the equations can be solved for each of the three channels, and the pixel R,G,B value for each point can be determined. Thus, by solving the coefficient matrix and applying that into the Poisson equation, a pixel's RGB value can be obtained. The whole image can be seen as the matrix. The ROI may be the matrix that is used with the coefficient matrix.

Embodiments disclosed herein can use Python, Matlab, Keras, and/or TensorFlow.

Figure 24:
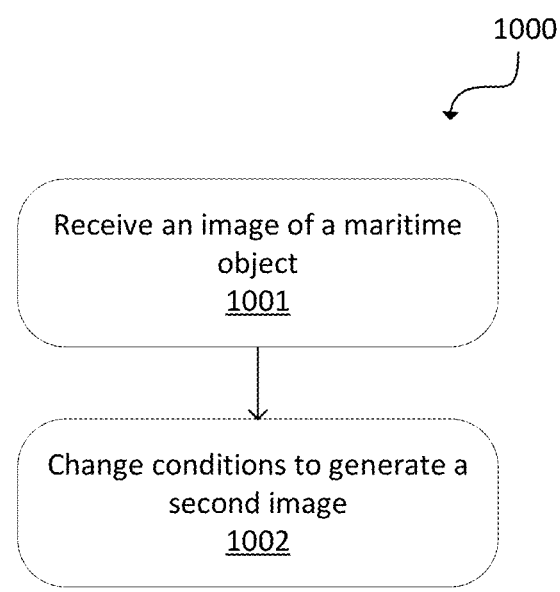
FIG. 24 is a flowchart of another embodiment in accordance with the present disclosure.

FIG. 24 illustrates an embodiment of the method 1000. At 1001, an image of a maritime object is received. A background image also can optionally be received. At 1002, water conditions, sky conditions, and/or light conditions are changed to generate a second image.

The second image of the method 1000 can be used to train an artificial intelligence system.

An additional embodiment relates to a non-transitory computer-readable medium storing program instructions executable on a controller for performing a computer-implemented method for generating data of obscure maritime vessels or other objects. An electronic data storage unit or other storage medium may contain non-transitory computer-readable medium that includes program instructions executable on a processor. The computer-implemented method may include any step(s) of any method(s) described herein.

Program instructions implementing methods such as those described herein may be stored on computer-readable medium, such as in the electronic data storage unit or other storage medium. The computer-readable medium may be a storage medium such as a magnetic or optical disk, a magnetic tape, or any other suitable non-transitory computer-readable medium known in the art.

The program instructions may be implemented in any of various ways, including procedure-based techniques, component-based techniques, and/or object-oriented techniques, among others. For example, the program instructions may be implemented using ActiveX controls, C++ objects, JavaBeans, Microsoft Foundation Classes (MFC), Streaming SIMD Extension (SSE), or other technologies or methodologies, as desired.

An additional embodiment relates to a processor configured to operate any step(s) of any method(s) described herein.

An additional embodiment relates to an artificial intelligence module configured to be trained using a second image (e.g., synthesized image) generated using any method(s) described herein. The artificial intelligence module can be or can include a CNN that is trained to identify and classify objects in an image.

In an example, results of an image search for dhows is received, such as from a server. Only five images are included. This may not be a sufficient number to train an artificial intelligence system. To train the artificial intelligence, each of those five images of dhows can be altered using the embodiments disclosed herein. Thus, the dhows in the five images are synthesized in various second images. Each of these second images can include one of the dhows with different water, sky, and/or light conditions. Thus, one of the dhows on a calm sea during a cloudless day can be synthesized into second images of that same dhow on rough or choppy seas, at dawn or dusk, in cloudy conditions, in stormy conditions, in hazy conditions, near a shore, near an island, near an iceberg, or in other variations. This can provide a library of different dhow images that can be used to train the artificial intelligence system.

Water conditions can include calm water, choppy water, water conditions resulting from a storm, or huge waves. Sky conditions can include various weather conditions (rain, fog, hurricane, light clouds, heavy clouds), eclipse, or northern lights.

In an embodiment, the size or placement of the dhow can be vary in the second images.

In another embodiment, the direction the dhow is facing can be reversed in the second images.

In yet another embodiment, the heading of the dhow can be changed in the second images. Thus, the dhow can be skewed or rotated to make it appear as if it has different headings.

In yet another embodiment, other objects can be added to the image. These include buoys, bridges, icebergs, animals, lighthouses, people (e.g., man overboard), other moving objects, or other static objects.

Figure 25:
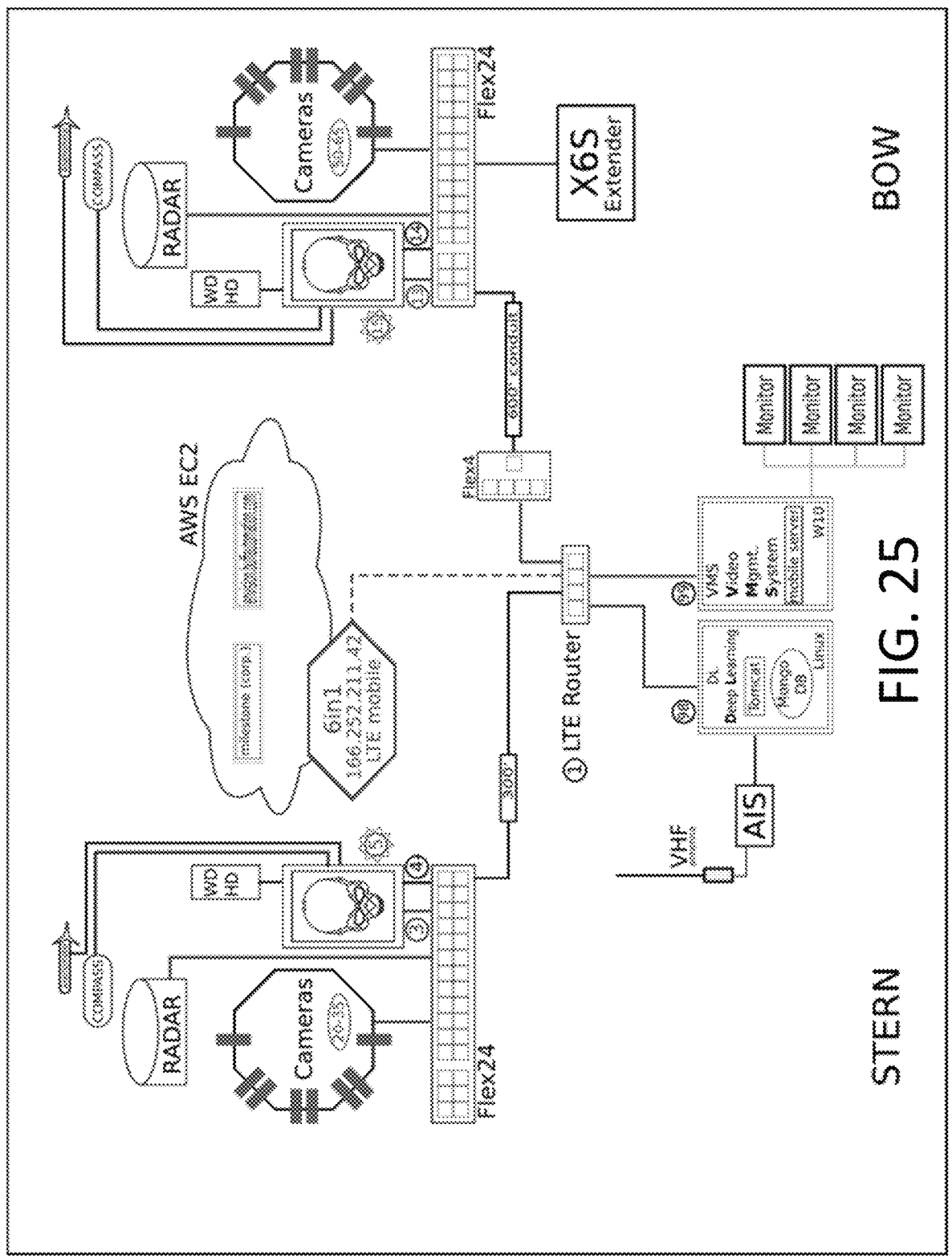
FIG. 25 is an exemplary network architecture diagram.

Additionally, the resulting artificial intelligence system can be trained online to generate a binary file that is deployed offline. FIG. 25 is a network architecture diagram that illustrates connections to an offline system and how the offline system communicates with the cloud. The network architecture diagram is related to use on a maritime vessel with a set of cameras and sensors at the bow and another set of cameras and sensors at the stern.

As can be seen from the description of the embodiments provided herein, therefore, the embodiments described herein provide a number of new and advantageous features and/or functionality.

While disclosed specifically with maritime vessels, the embodiments disclosed herein can be applied to other vehicles such as automobiles, trucks, buses, trains or other vehicles.

In some embodiments, the same system may be used to gather machine learning data may be the system deployed to operate a maritime vessel once training is complete.

The steps of the method described in the various embodiments and examples disclosed herein are sufficient to carry out the methods of the present invention. Thus, in an embodiment, the method consists essentially of a combination of the steps of the methods disclosed herein. In another embodiment, the method consists of such steps.

Although the present disclosure has been described with respect to one or more particular embodiments, it will be understood that other embodiments of the present disclosure may be made without departing from the scope of the present disclosure.

What is claimed is:

1. A method comprising:
    training, using a processor, an object detection network with training images to identify and classify objects in images from a sensor system disposed on a maritime vessel, wherein the object detection network is a convolution neural network that includes layers having weights;
    identifying objects in the images using the object detection network in an offline mode;
    classifying the objects in the images using the object detection network in the offline mode such that pixels in the images are associated with at least one the objects using a filter, and wherein the objects include at least a body of water and a watercraft;
    generating heat maps in the offline mode, wherein the heat maps are based on stereoscopic output disparity maps that depict distance with shading; and
    sending instructions regarding operation of the maritime vessel, using the processor, based on the objects that are identified, wherein the instructions include a speed or a heading.

2. The method of claim 1, wherein the method further comprising training, using the processor, the object detection network to send the instructions regarding operation of the maritime vessel based on the objects that are identified.

3. The method of claim 1, wherein the objects further include a shore, an iceberg, a static far object, or a moving far object, and wherein the watercraft includes a personal non-powered vessel, recreational powered vessel, sailing yacht, cargo ship, cruise ship, coast guard boat, naval vessel, barge, tugboat, fishing vessel, workboat, under-powered vessel, or anchored vessel.

4. The method of claim 1, further comprising performing deduplication of the training images using hash outputs prior to the training.

5. The method of claim 1, wherein the training images are determined by:
    receiving an initial image of a maritime object at a processor; and
    changing at least one of water conditions, sky conditions, or sunlight in the image of the maritime object to generate one of the training images that includes the maritime object using the processor.

6. A non-transitory computer readable medium storing a program configured to instruct the processor to execute the identifying, the classifying, the generating, and the sending of claim 1.

7. The object detection network trained using the method of claim 1.

8. A method comprising:
    receiving an image of a maritime object at a processor, wherein the maritime object is a watercraft;
    changing at least one of water conditions, sky conditions, or sunlight in the image of the maritime object to generate a second image that includes the maritime object using the processor, wherein the changing includes:
        generating a mask for the image of the maritime object;
        synthesizing a background; and
        blending the background and the image of the maritime object to form the second image; and
    training an object detection network using the second image, wherein the object detection network is a convolution neural network that includes layers having weights.

9. The method of claim 8, wherein a plurality of the second images are generated, wherein each of the plurality of the second images has a different one of the water conditions, the sky conditions, or the sunlight, and further comprising performing deduplication of the second images using hash outputs prior to the training.

10. The method of claim 8, further comprising receiving a background image with the water conditions, the sky conditions, or the sunlight used in the second image.

11. The method of claim 8, wherein the changing further includes blending a region of the image of the maritime object with a region of a background image.

12. The method of claim 8, wherein the changing further includes determining a gradient field of the image of the maritime object.

13. The method of claim 12, wherein the changing further includes determining a gradient field of a background image.

14. The method of claim 13, wherein the changing further includes determining a gradient field of the second image fusing the image of the maritime object and the background image.

15. The method of claim 13, wherein the changing further includes determining divergence of the second image.

16. The method of claim 15, wherein the changing further includes determining a solution for a coefficient matrix.

17. The method of claim 8, wherein the processor is in electronic communication with a data server, and wherein the data server provides the image of the maritime object.

18. A non-transitory computer readable medium storing a program configured to instruct a processor to execute the method of claim 8.

* * * * *